United States Patent
Masunaga et al.

(10) Patent No.: US 8,190,762 B2
(45) Date of Patent: May 29, 2012

(54) ELECTRONIC APPARATUS, CONTENT REPRODUCTION METHOD, AND PROGRAM

(75) Inventors: Shinya Masunaga, Tokyo (JP); Masham Samuel, Tokyo (JP); Tomoaki Takemura, Tokyo (JP)

(73) Assignee: Sony Corporation, Tokyo (JP)

(*) Notice: Subject to any disclaimer, the term of this patent is extended or adjusted under 35 U.S.C. 154(b) by 337 days.

(21) Appl. No.: 12/564,102

(22) Filed: Sep. 22, 2009

(65) Prior Publication Data

US 2010/0082833 A1  Apr. 1, 2010

(30) Foreign Application Priority Data

Sep. 29, 2008  (JP) ................. P2008-250879

(51) Int. Cl.
*G06F 15/16* (2006.01)
*H04N 7/173* (2011.01)

(52) U.S. Cl. ........................... 709/231; 725/94

(58) Field of Classification Search .......... 709/217–219, 709/230–232, 201–203; 725/31–34, 89–94
See application file for complete search history.

(56) References Cited

U.S. PATENT DOCUMENTS

| | | | | |
|---|---|---|---|---|
| 2004/0103445 | A1* | 5/2004 | Yoon et al. | 725/142 |
| 2006/0083486 | A1* | 4/2006 | Kanemaru et al. | 386/96 |
| 2006/0174287 | A1* | 8/2006 | Maeda | 725/80 |
| 2009/0043908 | A1* | 2/2009 | Masunaga et al. | 709/231 |

FOREIGN PATENT DOCUMENTS

| | | |
|---|---|---|
| JP | 2004-274619 | 9/2004 |
| JP | 2004-356829 | 12/2004 |
| JP | 2006-319956 | 11/2006 |
| JP | 2007-110704 | 4/2007 |
| JP | 2008-22507 | 1/2008 |
| JP | 2008-139423 | 6/2008 |
| JP | 2009-111917 | 5/2009 |

* cited by examiner

*Primary Examiner* — Yasin Barqadle
(74) *Attorney, Agent, or Firm* — Finnegan, Henderson, Farabow, Garrett & Dunner, L.L.P.

(57) ABSTRACT

An electronic apparatus includes a reception section, a buffer section, a reproduction section, an operation reception section, a transmission section, and a control section. The reception section receives data of a content transmitted through streaming from a transmission apparatus. The buffer section buffers the received data. The reproduction section successively reads out and reproduces the buffered data. The operation reception section receives a pause operation and a resume operation regarding reproduction of the data. The transmission section transmits, in response to the pause operation and the resume operation, a pause request and a resume request regarding the reproduction to the transmission apparatus. The control section controls the buffer means to discard data overlapping data received after the resume request among the data buffered by the buffer means and buffer data identical to the discarded data, that is received after the resume request.

10 Claims, 14 Drawing Sheets

RTP packet

US 8,190,762 B2

ELECTRONIC APPARATUS, CONTENT REPRODUCTION METHOD, AND PROGRAM

BACKGROUND OF THE INVENTION

1. Field of the Invention

The present invention relates to an electronic apparatus capable of reproducing a content through streaming via a network, a content reproduction method for the electronic apparatus, and a program therefor.

2. Description of the Related Art

In recent years, along with prevalence of broadband networks, there is an increasing demand for services that enable moving image contents to be reproduced via a network. In association therewith, various standards are being formulated and services provided.

As methods for such services, there are a download method and a streaming method. Of those, the streaming method is a method in which a reception apparatus reproduces a content based on received streaming data of the content while a server transmits the streaming data to the reception apparatus on demand. In this case, a user is capable of requesting the server of a trick play such as fast-forwarding, pause, and speed-variable reproduction of the content via the reception apparatus.

In a case where the reception apparatus reproduces a content by the streaming method, requests and data need to be exchanged between the server and the reception apparatus through transmission and reception of packets. Therefore, a propagation delay corresponding to a network environment occurs in general. Thus, an unignorable deviation is caused between a screen on which a request is made by a user operation on the reception apparatus side and data actually transmitted from the server.

Regarding such a problem, Japanese Patent Application Laid-open No. 2008-022507 (hereinafter, referred to as Patent Document 1) discloses a receiving apparatus that realizes a reduction of a data delay by fast-forwarding streaming data accumulated in a buffer when it is detected that an operation of a switching request of streaming data has been made. The operation of a switching request of streaming data used herein refers to, for example, operations such as a switch of an apparatus that transmits streaming data, a switch of a channel, and rewinding, fast-forwarding, pause, and stop of a content.

SUMMARY OF THE INVENTION

Incidentally, in a case where an RTP (Real-time Transport Protocol) is used as a transmission protocol, data to be transmitted to the reception apparatus by the server is generally transmitted in a GOP (Group Of Picture) unit so as to enable the data to be processed as video data with a meaning. Therefore, when a data position requested for a pause by a user operation is in the middle of a GOP in a case where the reception apparatus carries out pause processing and resume (resume reproduction) processing in content reproduction, the server transmits data from a head of the GOP at a time of resuming the reproduction. In other words, the data position requested for a pause in the reception apparatus is not guaranteed to be the same as a data position transmitted to the reception apparatus from the server after resuming the reproduction. Therefore, if the reception apparatus processes the data transmitted from the server as it is, there is a problem that rewinding or a skip of a content may occur when resuming the reproduction to thus cause a disturbance of an image along therewith. This problem cannot be solved even with the technique disclosed in Patent Document 1.

In this regard, a technique in which a reception apparatus carries out reproduction using data accumulated in a buffer after a pause when resuming reproduction is conceivable. In this case, however, since data accumulated on a network during pause may be additionally accumulated in the buffer, an overflow of the buffer may occur due to a repetition of the pause processing and the resume processing.

In view of the circumstances as described above, there is a need for an electronic apparatus capable of smoothly resuming reproduction of streaming data that has been paused without causing an overflow of a buffer, a content reproduction method for the electronic apparatus, and a program therefor.

According to an embodiment of the present invention, there is provided an electronic apparatus including a reception means, a buffer means, a reproduction means, an operation reception means, a transmission means, and a control means.

The reception means receives data of a content transmitted through streaming from a transmission apparatus.

The buffer means buffers the received data.

The reproduction means successively reads out and reproduces the buffered data.

The operation reception means receives a pause operation and a resume operation regarding reproduction of the data.

The transmission means transmits, in response to the pause operation and the resume operation, a pause request and a resume request regarding the reproduction to the transmission apparatus.

The control means controls the buffer means to discard data overlapping data received after the resume request among the data buffered by the buffer means. The control means also controls the buffer means to buffer data identical to the discarded data, that is received after the resume request.

Examples of the electronic apparatus used herein include a television receiver, a reproducing apparatus such as an HDD (Hard Disk Drive)/BD (Blu-ray disc)/DVD recorder, a PC, a game machine, portable AV equipment, a cellular phone, and a car navigation apparatus. Data reproduction include decode processing and processing of outputting decoded data.

With this structure, since data overlapping data received after the resume request is discarded among the buffered data, a continuity between data at a time of a pause and data at a time of resuming reproduction is ensured, and reproduction of a content after the pause can be resumed smoothly. At the same time, since data received after the resume request is newly buffered in place of the discarded data, an overflow of the buffer means is prevented.

In the electronic apparatus, the control means may detect a first position of data received at a time of the pause operation and a second position of data that has been received first since the resume operation, the first position and the second position being positions on a reproduction time axis of the content. The control means may control, when the second position is located before the first position, the buffer means to discard the buffered data from the second position to the first position. The control means may also control the buffer means to buffer data from the second position to the first position received after the discard.

In this case, the control means may control the reproduction means to resume the reproduction when the data from the second position to the first position received after the discard is buffered.

Accordingly, by detecting the first position and the second position, the control means can grasp an overlap relationship between the already-buffered data and the data received after resuming the reproduction. Since the data from the second position to the first position is discarded from the buffer means and newly-received data after the second position is buffered, a buffering data amount can be kept constant. Therefore, the electronic apparatus is capable of preventing an overflow and underflow of the buffer means. Although the first position and the second position are grasped by a timestamp contained in a data packet, for example, they may be grasped based on other information.

In the electronic apparatus, the control means may detect a third position of data that has been received first among the data buffered by the buffer means at the time of the pause operation, along the reproduction time axis. The control means may control, when the second position is located before the third position, the buffer means to discard the buffered data from the third position to the first position and the received data before the third position. The control means may also control the buffer means to buffer data from the third position to the first position received after the discard.

In this case, the control means may control the reproduction means to resume the reproduction when the data from the third position to the first position received after the discard is buffered.

Accordingly, by detecting the third position and comparing the third position and the second position, the control means can grasp a case where data received after the reproduction is resumed is not buffered, that is, a case where the data has already been read out by the reproduction means. In this case, the buffer means discards all pieces of buffered data and further discards incoming data until the data of the third position is received. Moreover, the buffer means buffers the incoming data from the third position to the first position. Therefore, even when the data that has been received first since resuming the reproduction has already been read out by the reproduction means, by discarding the incoming data and re-buffering the incoming data up to the first position, the electronic apparatus can smoothly resume the reproduction while preventing an overflow.

In the electronic apparatus, the control means may detect a fourth position of data that has been received last during a period from the time of the pause operation to the time of the resume operation, along the reproduction time axis. The control means may control, when the second position is located between the first position and the fourth position, the buffer means to discard the buffered data from the second position to the fourth position.

In this case, the control means may control the reproduction means to resume the reproduction when the data from the second position to the fourth position is discarded.

Accordingly, by detecting the fourth position and comparing the fourth position with the second position and the first position, the control means can grasp a case where the second position is located between the first position and the fourth position, that is, a case where the data received after the reproduction is resumed does not contain data that has been buffered during the pause. In this case, the buffer means discards, among the data received and buffered during the period from the time of the pause operation to the time of the resume operation, data overlapping the data received after resuming the reproduction. The reproduction means resumes the reproduction at a time this data is discarded. Therefore, the electronic apparatus can smoothly resume the reproduction while suppressing an increase of the buffering data amount as much as possible.

In the electronic apparatus, the control means may control, when the second position is located after the fourth position, the transmission means to transmit to the transmission apparatus the resume request that requests the data to be transmitted from the first position at a time the resume request is transmitted next.

Accordingly, in a case where a gap is caused between the data received at the time of the pause operation and the data received after the reproduction is resumed, the transmission means can request the transmission apparatus to resume the transmission of the data from the incoming data obtained at the time of the pause operation, at the time the resume request is transmitted next. Therefore, even when the transmission apparatus is specified to transmit data from a head of a GOP at the time of resuming the transmission, at a time the transmission is resumed next, the transmission of the data is resumed from data at a head of the GOP that contains at least the data at the time of the pause. When the incoming data obtained after resuming the reproduction overlaps the buffered data, the processing described above is executed. Thus, the electronic apparatus can smoothly resume the reproduction while preventing a data skip at the time of resuming the reproduction.

In the electronic apparatus, the control means may detect a fourth position of data that has been received last during a period from the time of the pause operation to the time of the resume operation, along the reproduction time axis. The control means may control, when the second position is located between the first position and the fourth position, the transmission means to transmit to the transmission apparatus the resume request that requests the data to be transmitted from the first position at a time the resume request is transmitted next.

Accordingly, in a case where the incoming data after the reproduction is resumed is data received during a period from the time of the pause operation to the time of the resume operation, the transmission means can request the transmission apparatus to resume the transmission of data from the data received at the time of the pause operation, at the time the resume request is transmitted next. Therefore, even when the transmission apparatus is specified to transmit data from a head of a GOP at the time of resuming the transmission, at the time the transmission is resumed next, the transmission of the data is resumed from data at a head of the GOP that contains at least the data received at the time of the pause. When the incoming data obtained after resuming the reproduction overlaps the buffered data, the processing described above is executed. Thus, the electronic apparatus can prevent an overflow of the buffer means due to extra buffering of data received during the period from the time of the pause operation to the time of the resume operation.

Further, in this case, the control means may control, when an amount of data buffered by the buffer means exceeds a predetermined amount, the transmission means to transmit to the transmission apparatus the resume request that requests the data to be transmitted from the first position.

Accordingly, the control means can control the transmission means not to transmit a resume request from the first position when the buffering data amount of the buffer means is below the predetermined amount and there is no fear of an overflow. Therefore, by dynamically controlling the transmission of the resume request, the electronic apparatus can prevent lowering of a user response due to transmission of a resume request after the resume operation, while preventing an overflow of the buffer means.

According to another embodiment of the present invention, there is provided a content reproduction method including receiving data of a content transmitted through streaming from a transmission apparatus.

The received data is buffered.

The buffered data is successively read out and reproduced.

A pause operation and a resume operation regarding reproduction of the data are received.

In response to the pause operation and the resume operation, a pause request and a resume request regarding the reproduction are transmitted to the transmission apparatus.

Data overlapping data received after the resume request among the buffered data is discarded, and data identical to the discarded data, that is received after the resume request is buffered.

With this structure, since data overlapping the data received after the resume request is discarded among the buffered data, a continuity between data at the time of the pause and data at the time of resuming the reproduction is ensured, and reproduction of a content after the pause can be resumed smoothly. At the same time, since data received after the resume request is newly buffered in place of the discarded data, an overflow of the buffer means is prevented.

According to another embodiment of the present invention, there is provided a program causing an electronic apparatus to execute a reception step, a buffer step, a reproduction step, an operation reception step, a transmission step, and a control step.

The reception step includes receiving data of a content transmitted through streaming from a transmission apparatus.

The buffer step includes buffering the received data.

The reproduction step includes successively reading out and reproducing the buffered data.

The operation reception step includes receiving a pause operation and a resume operation regarding reproduction of the data.

The transmission step includes transmitting, in response to the pause operation and the resume operation, a pause request and a resume request regarding the reproduction to the transmission apparatus.

The control step includes discarding data overlapping data received after the resume request among the buffered data. The control step also includes buffering data identical to the discarded data, that is received after the resume request.

According to another embodiment of the present invention, there is provided an electronic apparatus including a reception section, a buffer section, a reproduction section, an operation reception section, a transmission section, and a control section.

The reception section receives data of a content transmitted through streaming from a transmission apparatus.

The buffer section buffers the received data.

The reproduction section successively reads out and reproduces the buffered data.

The operation reception section receives a pause operation and a resume operation regarding reproduction of the data.

The transmission section transmits, in response to the pause operation and the resume operation, a pause request and a resume request regarding the reproduction to the transmission apparatus.

The control section controls the buffer means to discard data overlapping data received after the resume request among the data buffered by the buffer means and buffer data identical to the discarded data, that is received after the resume request.

As described above, according to the embodiments of the present invention, reproduction of streaming data that has been paused can be resumed smoothly without causing an overflow of a buffer.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, an embodiment of the present invention will be described with reference to the drawings.

(Outline of System)

Figure 1:
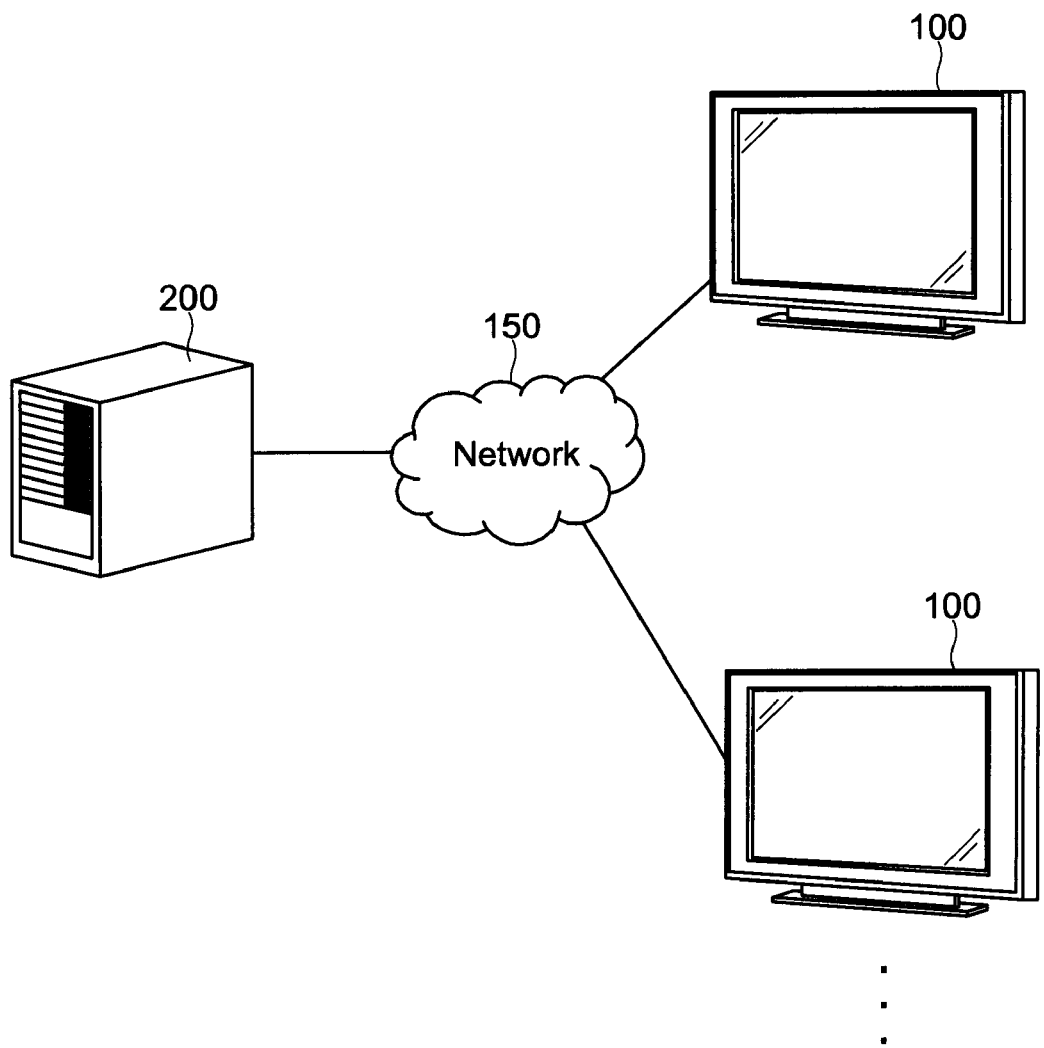
FIG. 1 is a diagram schematically showing a content delivery system including a TV according to an embodiment of the present invention.

FIG. 1 is a diagram schematically showing a content delivery system including a television receiver as an electronic apparatus according to the embodiment of the present invention.

As shown in the figure, the content delivery system of this embodiment is structured by connecting a plurality of television receivers 100 (hereinafter, referred to as TV 100) and a server 200 via a network 150.

The server 200 stores data of a content and delivers, through streaming, data of the content in response to a request from the TV 100 connected thereto via the network 150.

Based on the request from the user, the TV 100 carries out various types of processing such as requesting transmission of data of a content and reception of the data, with respect to the server 200, and reproduces streaming data received. A format of streaming data in this embodiment is, for example, timestamp-attached MPEG2-TS (Transport Stream).

The network 150 is structured by the server 200 and a specific TV 100 authorized to access the server 200, for example. For example, a UDP (User Datagram Protocol) and an RTP (Real-time Transport Protocol) are used as transmission protocols for streaming delivery. However, the network 150 may be an open network that an arbitrary TV 100 is capable of using, such as the Internet. As the transmission protocol, an HTTP (Hypertext Transfer Protocol) or a TCP (Transmission Control Protocol) may also be used. As a transmission channel, a wired cable such as an optical fiber or a wireless transmission channel such as radio waves may be used, for example. Further, the network 150 may include relay equipment such as a router and a base station. Examples of the content include video data including a movie, a TV program, a document, a photograph, a picture, and a chart, audio data including music and a radio program, and arbitrary data including a game program.

(Hardware Structure of TV)

Figure 2:
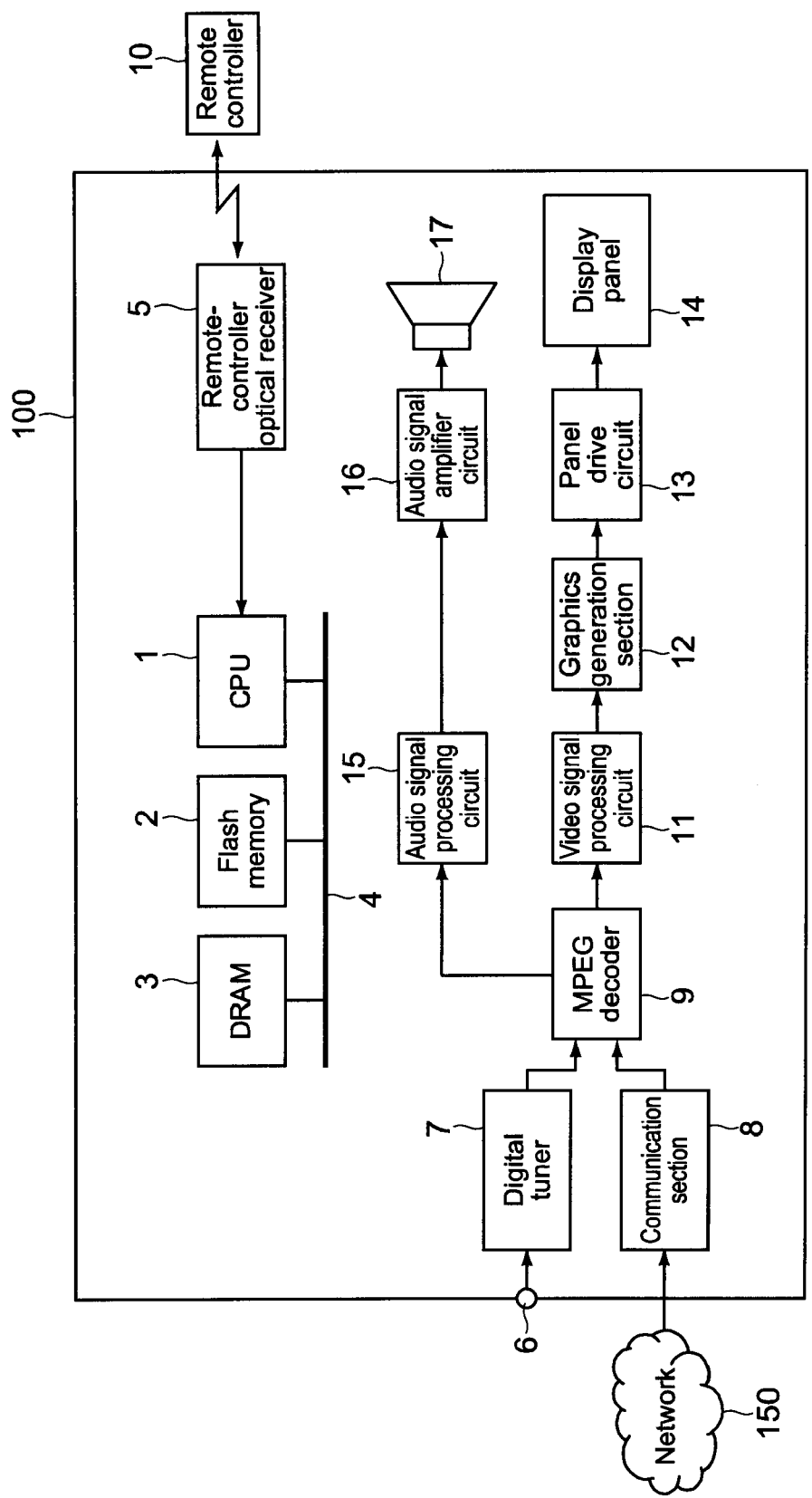
FIG. 2 is a diagram showing a hardware structure of the TV according to the embodiment of the present invention.

FIG. 2 is a block diagram showing a hardware structure of the TV 100.

As shown in the figure, the TV 100 includes a CPU (Central Processing Unit) 1, a flash memory 2, a DRAM (Dynamic Random Access Memory) 3, an internal bus 4, a remote-controller optical receiver 5, a digital antenna input terminal 6, a digital tuner 7, a communication section 8, an MPEG decoder 9, a video signal processing circuit 11, a graphics generation section 12, a panel drive circuit 13, a display panel 14, an audio signal processing circuit 15, an audio signal amplifier circuit 16, and a loudspeaker 17.

The digital antenna input terminal 6 is used to input broadcast signals of digital broadcasts received by a digital antenna (not shown). The digital tuner 7 tunes in to a signal of a selected channel from the broadcast signals and outputs the signal to the MPEG decoder 9. The communication section 8 is constituted of, for example, a network interface card, and executes communication processing with respect to the server 200 via the network 150.

The MPEG decoder 9 decodes broadcast signals encoded according to an MPEG standard or streaming data received from the server 200 and outputs, out of the decoded signals, video signals and audio signals to the video signal processing circuit 11 and the audio signal processing circuit 15, respectively.

The video signal processing circuit 11 performs video processing necessary for the input video signals and outputs the processed signals to the graphics generation section 12. The graphics generation section 12 integrates the input video signals with a GUI (Graphical User Interface) screen or the like by OSD (On Screen Display) processing and outputs the resultant to the panel drive circuit 13. The panel drive circuit 13 carries out a digital/analog conversion or the like on the video signals supplied from the graphics generation section 12 and drives the display panel 14 based on analog video signals. Examples of the display panel 14 include an LCD (Liquid Crystal Display), a PDP (Plasma Display Panel), and an OEL (Organic Electro-Luminescence) display, and the display panel 14 displays the analog video signals input from the panel drive circuit 13.

The audio signal processing circuit 15 performs audio processing necessary for the input audio signals and outputs the processed signals to the audio signal amplifier circuit 16. The audio signal amplifier circuit 16 adjusts a volume of the input audio signals to a necessary volume and outputs the signals to the loudspeaker 17 so that the signals are reproduced therefrom.

The CPU 1 accesses the DRAM 3 or the like as necessary and collectively controls the blocks of the TV 100. The flash memory 2 is a nonvolatile memory that fixedly stores an OS executed by the CPU 1 and firmware such as programs including applications for receiving and reproducing contents, and various parameters. The DRAM 3 is used as a working area of the CPU 1 and temporarily stores an OS, programs, processing data, and the like. The CPU 1, the flash memory 2, and the DRAM 3 are connected to the internal bus 4, and the entire TV 100 is controlled based on mutual accesses of the CPU 1, the flash memory 2, and the DRAM 3.

The remote-controller optical receiver 5 receives a user operation by a remote control signal from a remote controller 10 and outputs the remote control signal to the CPU 1. Accordingly, control processing of the TV 100, such as reception, reproduction, and the like of a content corresponding to the user operation is executed. The remote controller 10 includes various operation sections such as numeric keys respectively corresponding to broadcast channels, a menu button, a reproduction button, a pause button, a fast-forward button, and a rewind button. In addition to the remote controller 10 and the remote-controller optical receiver 5, the TV 100 may include a button, a key, a touch panel, and the like that receive various operations by being directly operated by a user, or operations may be received from other input apparatuses such as a mouse and a keyboard.

Though detailed descriptions of a hardware structure of the server 200 will be omitted, the server 200 includes minimum hardware elements and software elements necessary to function as a computer, such as a CPU, a RAM, an HDD, a communication section, and a communication application.

(Software Structure of TV)

Figure 3:
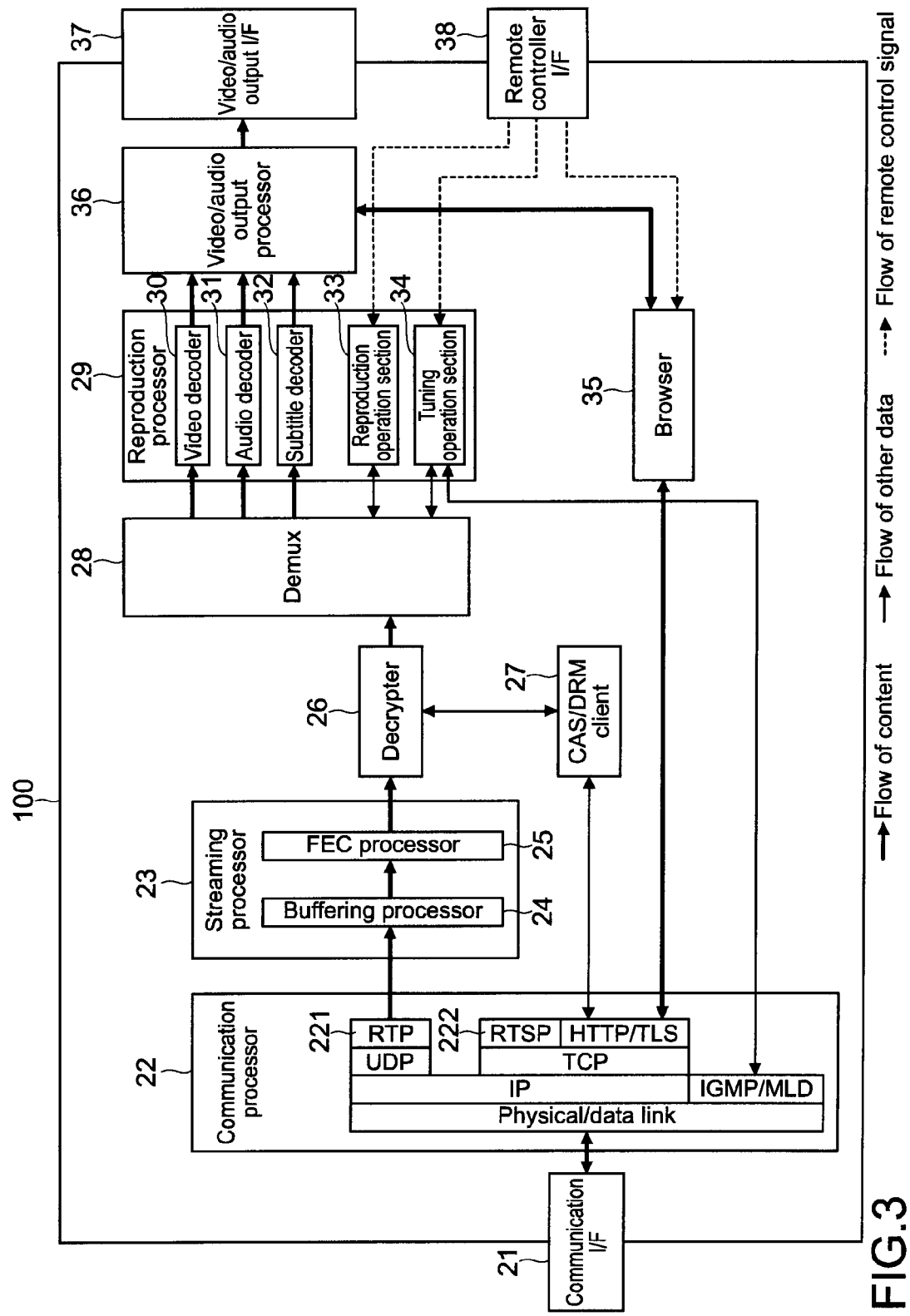
FIG. 3 is a diagram showing a software structure of the TV according to the embodiment of the present invention.

FIG. 3 is a diagram showing a software structure of the TV 100.

As shown in the figure, the TV 100 includes as software a communication interface (I/F) 21, a communication processor 22, a streaming processor 23, a decrypter 26, and a CAS (Conditional Access System)/DRM (Digital Rights Management) client 27. The TV 100 also includes as software a demultiplexer 28, a reproduction processor 29, a browser 35, a video/audio output processor 36, a video/audio output interface 37, and a remote controller interface 38. In the figure, arrows in bold lines indicate flows of contents (streaming data), arrows in thin lines indicate flows of other data, and arrows in broken lines indicate flows of control signals from the remote controller 10.

The communication interface (I/F) 21 controls packet communication processing of the communication section 8 and the communication processor 22 with the server 200. The communication processor 22 includes a plurality of processors (programs) for executing packet communication using various protocols in a physical layer, a data link layer, a network layer, a transport layer, and an application layer in an OSI reference model. Functioning in the network layer are an IP (Internet Protocol) and an IGMP (Internet Group Management Protocol)/MLD (Multicast Listener Discover Protocol). Functioning in the transport layer are a UDP (User Datagram Protocol) and a TCP (Transmission Control Protocol). Functioning in the application layer are an RTP as a higher-layer protocol of the UDP and an RTSP (Real Time Streaming Protocol) and HTTP (Hypertext Transfer Protocol)/TLS (Transport Layer Security) as higher-layer protocols of the TCP. In this embodiment, a content delivered through streaming from the server 200 is processed by an RTP processor 221 as an RTP packet. An RTSP processor 222 transmits to the server an RTSP request of play, pause, and the like while a content received as the RTP packet is reproduced.

The streaming processor 23 processes streaming data (RTP packet data) from the server 200 received by the communication processor 22 using the RTP and supplies the data to the decrypter 26. The streaming processor 23 includes a buffering processor 24 and an FEC (Forward Error Correction) processor 25. The buffering processor 24 includes a buffer for buffering the received streaming data (hereinafter, referred to as reception buffer). The streaming data buffered by the reception buffer is kept at an appropriate buffer amount that causes no overflow nor underflow by the streaming processor 23 and supplied to the reproduction processor 29 at an appropriate timing. A flow control of the reception buffer will be described later in detail.

The FEC processor 25 uses an FEC added to the streaming data buffered by the buffering processor 24 to detect and correct an error in the streaming data. Moreover, the streaming processor 23 removes a jitter caused in the streaming data, for example.

The decrypter 26 decrypts the encrypted streaming data supplied from the streaming processor 23 using a decryption key acquired from the CAS/DRM client 27.

The CAS/DRM client 27 receives license information on CAS and DRM from a CAS/DRM server (not shown) on the network 150 and analyzes it. Then, when it is judged that the TV 100 has a legal authority to view a content encrypted by the CAS and DRM, the CAS/DRM client 27 supplies the decryption key to the decrypter 26.

The demultiplexer 28 separates the multiplexed streaming data supplied from the decrypter 26 into elementary streams (ES: Elementary Stream) of a video, an audio, and a subtitle, and supplies them to the reproduction processor 29. A video ES, an audio ES, and a subtitle ES are output to a video decoder 30, an audio decoder 31, and a subtitle decoder 32, respectively.

The reproduction processor 29 includes the video decoder 30, the audio decoder 31, and the subtitle decoder 32 and cooperates with the MPEG decoder 9 or the like to process the ES's supplied from the demultiplexer 28. The video decoder 30 decodes the video ES and generates a video signal. The audio decoder 31 decodes the audio ES and generates an audio signal. The subtitle decoder 32 decodes the subtitle ES, generates a subtitle signal, and superimposes the subtitle signal on the video signal. The generated video signal and audio signal are supplied to the video/audio output processor 36. The decoders 30 to 32 each include a built-in buffer. The decoders 30 to 32 accumulate the signals in the respective buffers and adjust timings to supply the signals to the video/audio output processor 36.

A compression format of the video ES is, for example, MPEG-2. However, other compression formats such as MPEG-4 may be used instead. A compression format of the audio ES is, for example, AAC (Advanced Audio Coding). However, other compression formats such as MPEG-2BC (Backward Compatible), MP-3 (MPEG1 Layer-3), LPCM (Linear PCM), WMA9 (Windows (registered trademark) Media Audio 9), ATRAC (Adaptive Transform Acoustic Coding), and ATRAC3 may be used instead.

Further, the reproduction processor 29 includes a reproduction operation section 33 and a tuning operation section 34. At a time of reproducing streaming data, the reproduction operation section 33 carries out various types of reproduction processing such as reproduction start, pause, and speed-variable reproduction based on a control signal from the remote controller 10 (remote control signal). At a time of reproducing a broadcast content received by the digital tuner 7, the tuning operation section 34 carries out channel tuning (switch) processing based on the remote control signal.

The remote controller I/F 38 receives the remote control signal transmitted from the remote controller 10 based on a user operation and supplies it to the reproduction operation section 33 and the tuning operation section 34.

The video/audio output processor 36 performs video processing and audio processing necessary for output, such as D/A conversion processing, on the video signal and audio signal supplied from the reproduction processor 29, and supplies the signals to the video/audio output I/F 37.

The video/audio output I/F 37 cooperates with the video signal processing circuit 11 and the audio signal processing circuit 15 and outputs the video signal supplied from the video/audio output processor 36 to the display panel 14 for display, and causes the loudspeaker 17 to output the audio signal.

Based on the remote control signal, in cooperation with the communication processor 22, the browser 35 downloads an HTML (Hypertext Markup Language) file or an image file constituting a webpage, analyzes a layout thereof, and supplies the file to the video/audio output processor 36 for output.

(Structure of Streaming Data)

Next, a structure of streaming data transmitted from the server 200 in this embodiment will be described.

Figure 4:
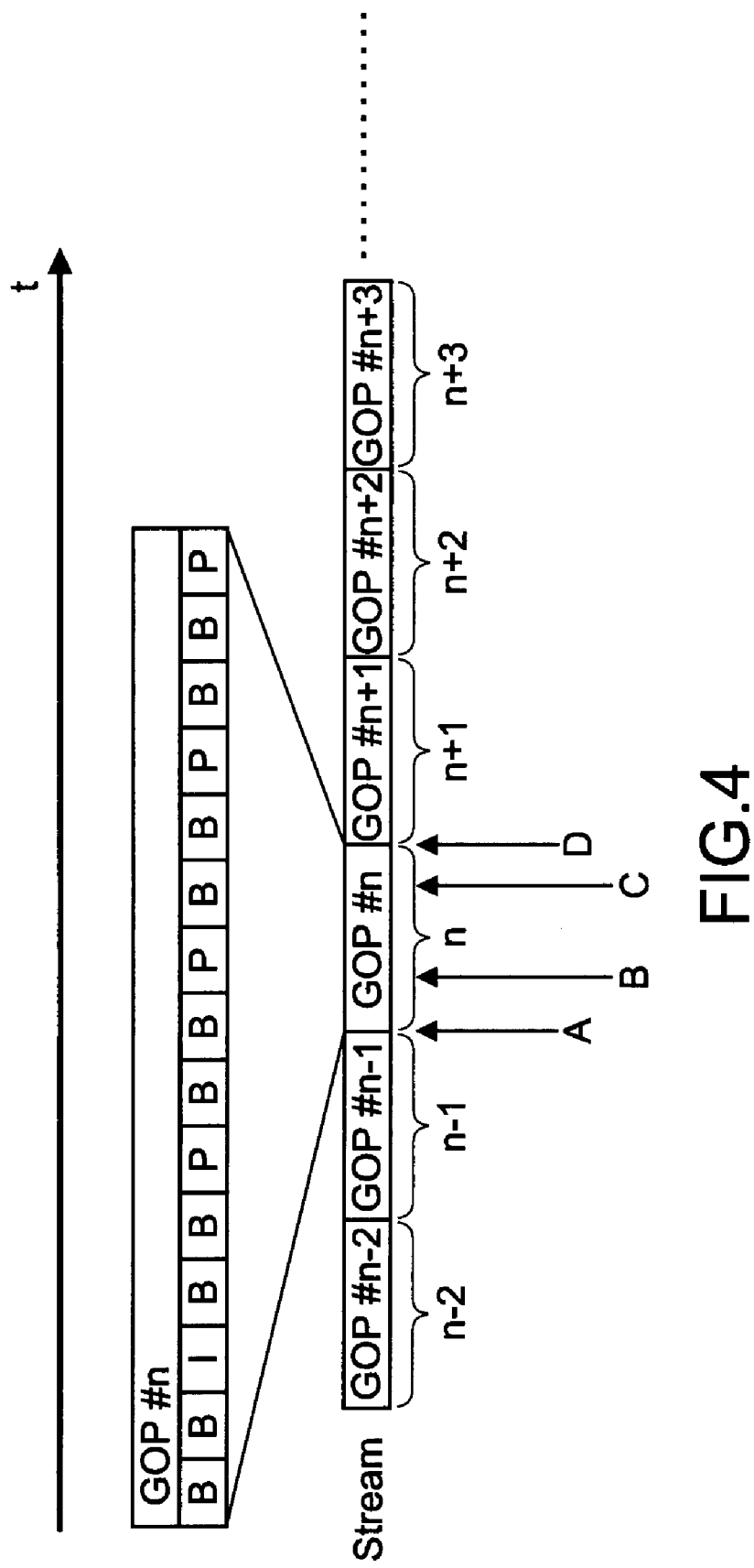
FIG. 4 is a diagram showing a GOP (Group Of Picture) structure of streaming data transmitted from a server according to the embodiment of the present invention.

FIG. 4 is a diagram showing a GOP structure of the streaming data.

As shown in the figure, each frame constituting the streaming data is compressed and transmitted in a GOP unit. Each GOP contains one I frame and a plurality of P frames and B frames.

When the TV 100 resumes reproduction of a content after pausing the reproduction, according to the RTSP, for example, a play request is transmitted while specifying a pause point acquired from the server 200 at a time of the pause. The pause point is expressed by an NPT (Normal Play Time) that indicates a reproduction time in a case of reproduction at a standard speed, and a range thereof is specified by a Range value.

Further, according to a specification of IPSP (IP Service Project) established by consumer-electronics manufacturers and telecommunications carriers in Japan including the applicant of the present invention, with respect to a specification of a pause point in a 100-ms unit, transmission of data is resumed from a head of a GOP containing data at that pause point.

For example, in a case where Point B in the middle of a GOP of a GOP #n is specified by the Range value or a pause point and the server 200 is requested to resume reproduction, the server 200 resumes transmission of data from data at Point A that is a head of the GOP #n.

Therefore, even if a point where the server 200 has stopped the transmission due to a pause operation made by a user is Point B, data from Point A to Point B is transmitted in an overlapping manner after the reproduction is resumed. In this case, in a conventional reproducing apparatus, if data received after the reproduction is resumed is reproduced as it is, there has been expected a problem that rewinding of a content occurs and images and audios are disturbed.

Moreover, there is also a case where, depending on a specification of the server, transmission is resumed from a head of a GOP that is closest to the pause point. For example, when the pause point is Point C, data transmission is resumed from Point D that is a head of a GOP #n+1 closest to Point C. In this case, since data from Point C as the pause point to Point D is not transmitted, there has been expected a problem that a skip occurs in the incoming data in the conventional reproducing apparatus. In addition, it is also expected that when the server 200 cannot transmit data properly due to some kind of an anomaly at a time of resuming the transmission or when data is lost on the network 150 during transmission, for example, a skip occurs in the incoming data.

In this regard, the TV 100 of this embodiment has a function of discarding, at a time of resuming reproduction of a content after a pause of the reproduction, an overlap (hereinafter, referred to as overlap data) between data stored in the reception buffer at the time of the pause and data transmitted from the server 200 after resuming the reproduction. Accordingly, reproduction of streaming data after the pause can be resumed smoothly. Furthermore, since a data amount of the reception buffer is maintained to be constant, the TV 100 can prevent an underflow and overflow of the reception buffer.

Figure 5:
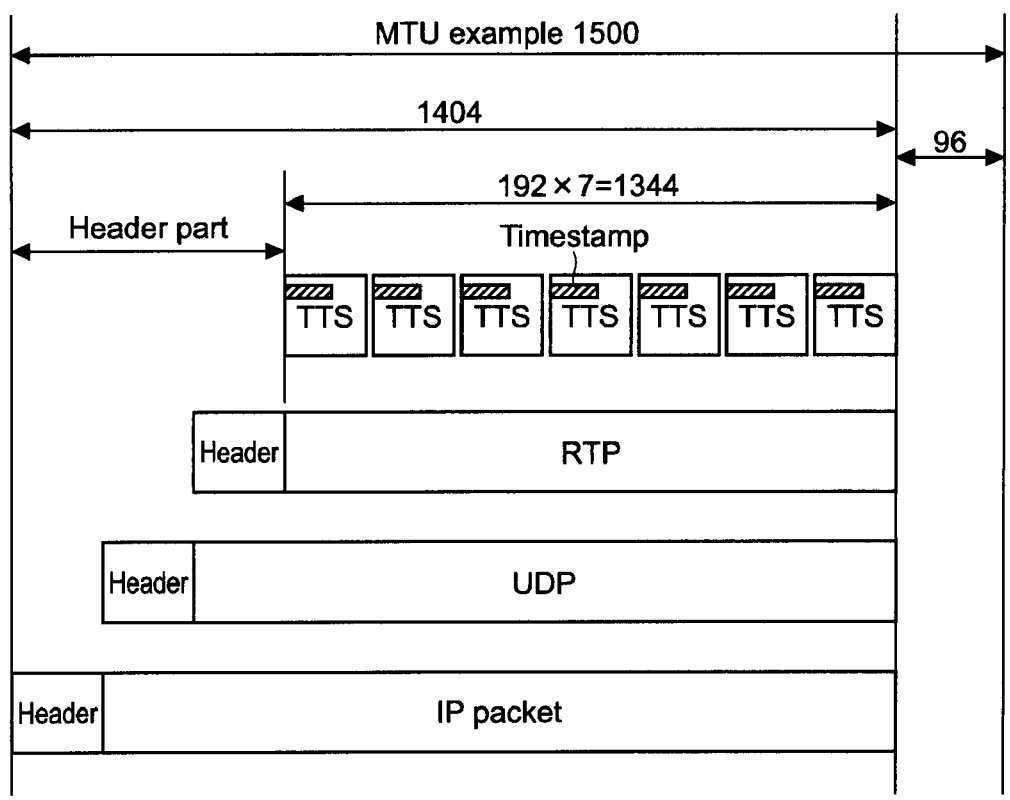
FIG. 5 is a diagram showing a structural example of an MTU (Maximum Transmission Unit) of streaming data transmitted from the server according to the embodiment of the present invention.

FIG. 5 is a diagram showing a structural example of an MTU (Maximum Transmission Unit) of streaming data transmitted from the server 200.

The MTU indicates a maximum transmission unit of streaming data from the server 200. The MTU includes a plurality of timestamp-attached TS (TTS) packets, an RTP header, a UDP header, and an IP packet. Each of the TTS packets is attached with, at a head thereof, a timestamp expressed in 4 bytes, for example.

Since the timestamp increases monotonically, the TV 100 can use the timestamp as an identifier for uniquely identifying a TTS packet of streaming data.

Figure 6:
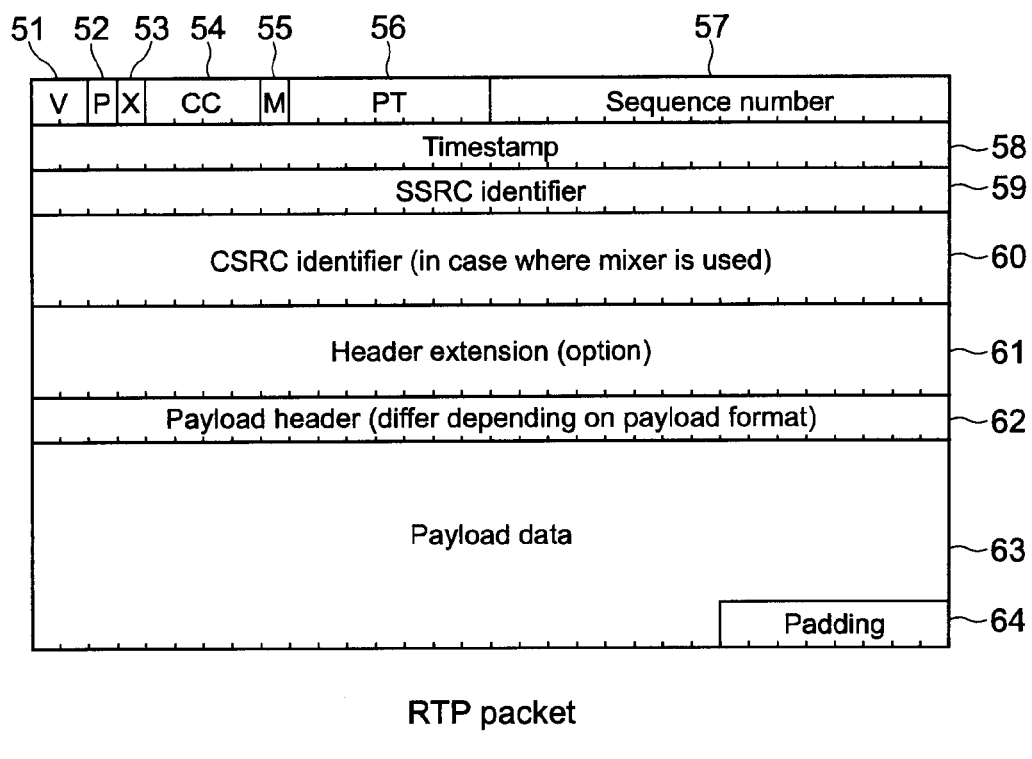
FIG. 6 is an explanatory diagram showing a structural example of an RTP (Real-time Transport Protocol) packet received according to the embodiment of the present invention.

FIG. 6 is an explanatory diagram showing a structural example of an RTP packet as the TTS packet.

As shown in the figure, the RTP packet includes version information (V) 51, padding information (P) 52, extension information (X) 53, CSRC count information (CC) 54, boundary information (M) 55, payload type information (PT) 56, a sequence number 57, a timestamp 58, and an SSRC identifier 59.

The SSRC identifier 59 is information for identifying a session of streaming data. For example, a value described in the SSRC identifier 59 contained in the streaming data acquired by the TV 100 before a pause and a value described in the SSRC identifier 59 contained in the streaming data acquired by the TV 100 after the reproduction is resumed are different. Therefore, the TV 100 can detect a switch between a stream before the pause and a stream after resuming the reproduction using the SSRC identifier 59.

The RTP packet also includes a CSRC identifier 60, a header extension 61, a payload header 62, payload data 63, and a padding 64.

(System Operation)

Next, an operation of the content delivery system structured as described above will be described while focusing on an operation of the TV 100.

First, preconditions for operating the system will be described. For the system to operate, the following three conditions are necessary.

(1) Streaming data needs to contain information for uniquely identifying packet data constituting the streaming data. The identifier is, for example, a timestamp as described above.

(2) It is desirable for the server 200 to transmit data in an overlapping manner before a pause of a content and after resuming reproduction. The expression "transmit data in an overlapping manner" means that at least one type of identifiers overlap between data transmitted before the pause of the reproduction of the content and data transmitted after the reproduction is resumed. In a case where the server 200 does not transmit overlap data, processing of adjusting a reproduction resume point to be described later is carried out on the TV 100 side, with the result that transmission of overlap data at the time the reproduction is resumed is ensured.

(3) It is necessary for packet data including at least one identifier to be present in the reception buffer of the streaming processor 23 of the TV 100.

Next, an outline of operations of the TV 100 and the server 200 will be described.

Figure 7:
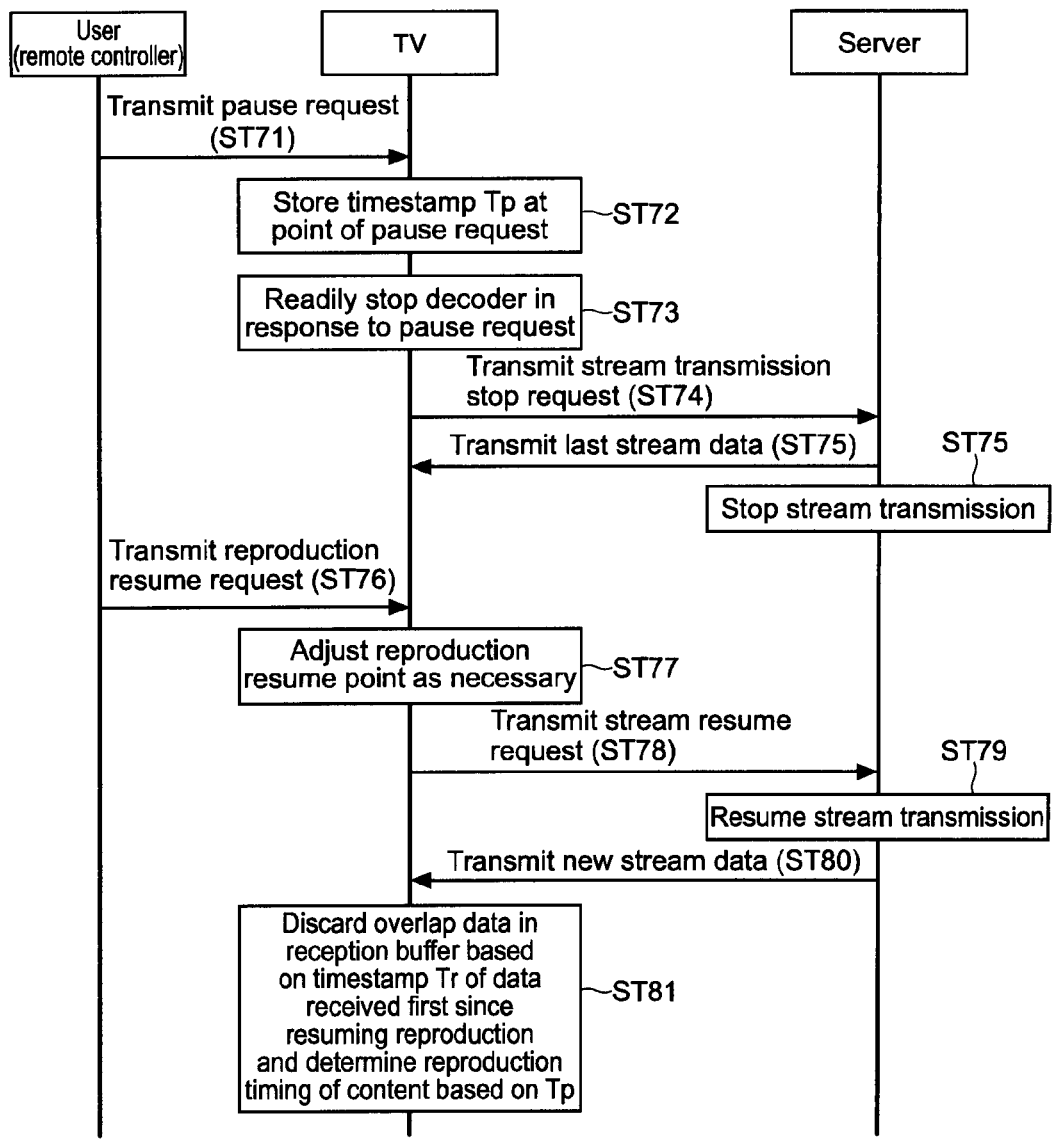
FIG. 7 is a sequence diagram showing rough exchanges of data between the TV and the server during a period from a time reproduction of a content is paused to a time the reproduction is resumed in the embodiment of the present invention.

FIG. 7 is a sequence diagram showing rough exchanges of data between the TV 100 and the server 200 in processing up to resuming reproduction of a content since the pause of the reproduction (resume reproduction processing).

As shown in the figure, by a user operation, a remote control signal for requesting a pause is first transmitted to the TV 100 from the remote controller 10 during reproduction of a content through streaming (Step 71). Upon receiving the signal, the TV 100 stores a timestamp Tp at a point the pause request is received in the DRAM 3 or the like (Step 72) and causes the MPEG decoder 9 to readily stop the processing in response to the pause request (Step 73). Then, the TV 100 transmits a request for stopping transmission of streaming data to the server 200 (Step 74).

In response to the stop request, the server 200 transmits last streaming data already prepared for the transmission (Step 75) and then stops transmitting the streaming data (Step 75). The TV 100 receives a pause point of the server 200 together with the last streaming data. The pause point is incorporated as a reproduction resume point in a play request transmitted to the server 200 from the TV 100 at the time the reproduction is resumed.

After that, by a user operation, a remote control signal that requests the reproduction of the content being paused to be resumed is transmitted to the TV 100 from the remote controller 10 (Step 76). Upon receiving the reproduction resume request, the TV 100 adjusts the reproduction resume point as necessary like when a skip is caused in the incoming data from the server 200 after the reproduction is resumed, for example (Step 77). This processing will be described later. Then, the TV 100 requests the server 200 to resume the transmission of streaming data from the reproduction resume point (Step 78).

In response to the reproduction resume request, the server 200 resumes the transmission of streaming data (Step 79) and transmits new streaming data to the TV 100 (Step 80).

Upon receiving the streaming data after resuming the transmission from the server 200, the TV 100 discards overlap data within the reception buffer based on a timestamp Tr of data that has been received first since resuming the reproduction. Then, the TV 100 determines a reproduction (decode) timing of the content based on Tp described above and resumes the reproduction (Step 81).

Next, a specific operation of the TV 100 from pausing reproduction of a content to resuming the reproduction will be described. In descriptions below, the operation of the TV 100 will be described with mainly the RTP processor 221 and the RTSP processor 222 as a subject of the operation. However, operations of the RTP processor 221 and the RTSP processor 222 are executed in cooperation with other software such as the streaming processor 23 and hardware such as the CPU 1 shown in FIG. 2.

Figure 8:
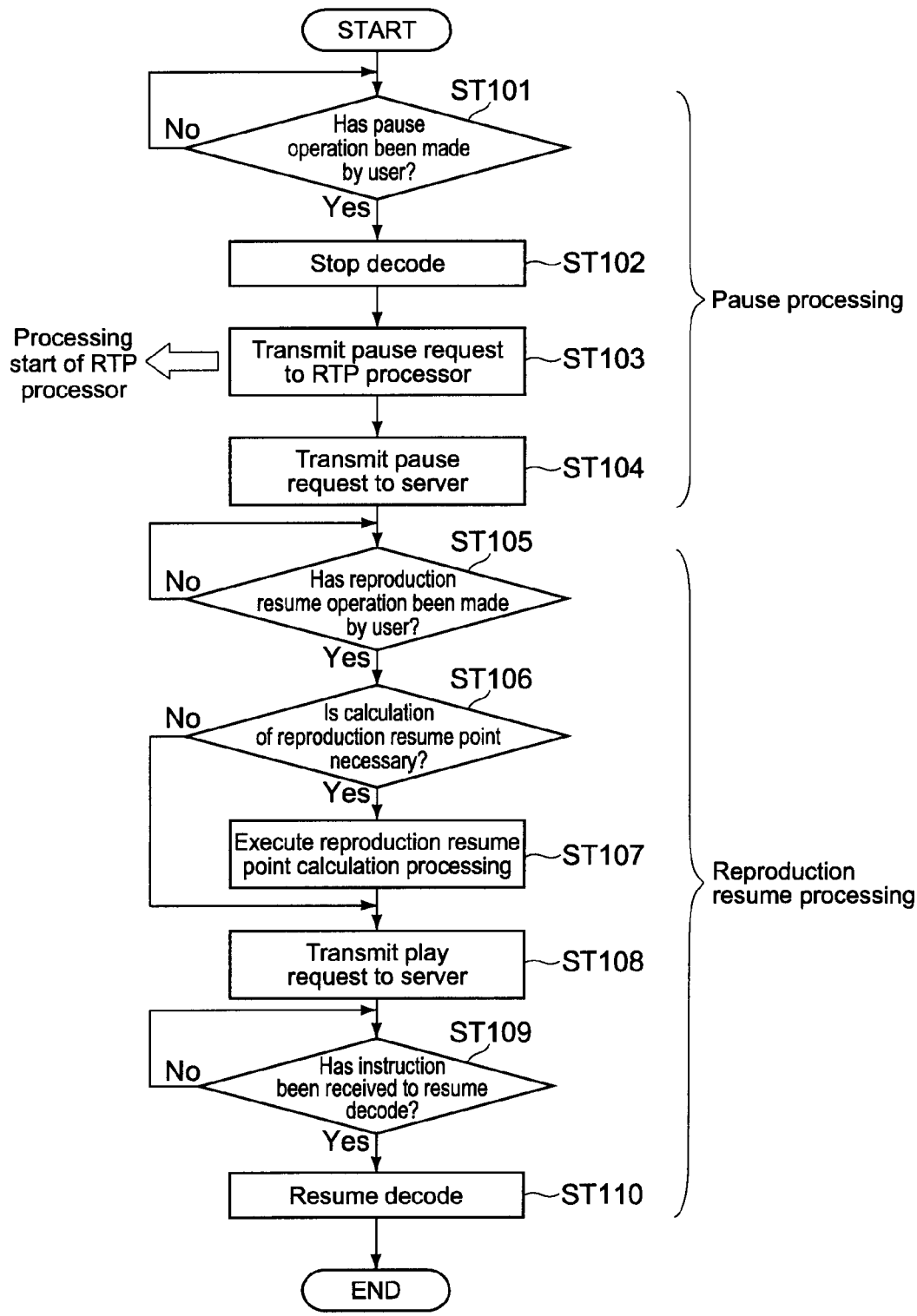
FIG. 8 is a flowchart showing an operational flow of an RTSP (Real Time Streaming Protocol) processor of the TV according to the embodiment of the present invention.

FIG. 8 is a flowchart showing an operational flow of the RTSP processor 222 of the TV 100. It should be noted that in this embodiment, processing of the RTSP processor 222 is asynchronous processing. In other words, the RTSP processor 222 advances to the next processing without waiting for processing to be actually executed on a request destination side or a result thereof.

As shown in the figure, the RTSP processor 222 first judges whether a pause operation has been made by the user during reproduction of a content, that is, whether a request of pausing the reproduction of the content has been received from the remote controller 10 (Step 101). When judged that the pause operation has been made, the RTSP processor 222 instructs the MPEG decoder 9 to stop decoding packet data in the reception buffer and pause the content reproduction (Step 102).

Subsequently, the RTSP processor 222 transmits to the RTP processor 221 a pause request that requests packet data reception processing to be stopped (Step 103). As a result, processing for smoothly resuming reproduction of a content is started in the RTP processor 221.

Following the pause request to the RTP processor 221, the RTSP processor 222 transmits to the server 200 a pause request that requests transmission of packet data to be stopped (Step 104).

Subsequently, the RTSP processor 222 judges whether a reproduction resume operation has been made by the user after the pause request, that is, whether a reproduction resume request of a content has been received from the remote controller 10 (Step 105). When judged that the reproduction resume operation has been made, the RTSP processor 222 judges as necessary whether reproduction resume point (pause point) adjustment processing is necessary (Step 106). When judged that the reproduction resume point adjustment processing is necessary (Yes), the RTSP processor 222 calculates the reproduction resume point (Step 107). This processing will be described later.

Then, the RTSP processor 222 transmits to the server 200 a play request that requests transmission of the packet data to be resumed from the pause point acquired from the server 200 at the time the pause request is made or from the adjusted reproduction resume point (Step 108).

After that, the RTSP processor 222 waits to be instructed by the RTP processor 221 to resume decode of the data whose decode has been paused (Step 109). When instructed to resume the decode (Yes), the RTSP processor 222 instructs the MPEG decoder 9 to resume the decode and causes the reproduction of videos and audios of the content to be resumed (Step 110).

Next, a description will be given on processing of the RTP processor 221 for smoothly resuming reproduction, that is started by the pause request from the RTSP processor 222.

Figure 9:
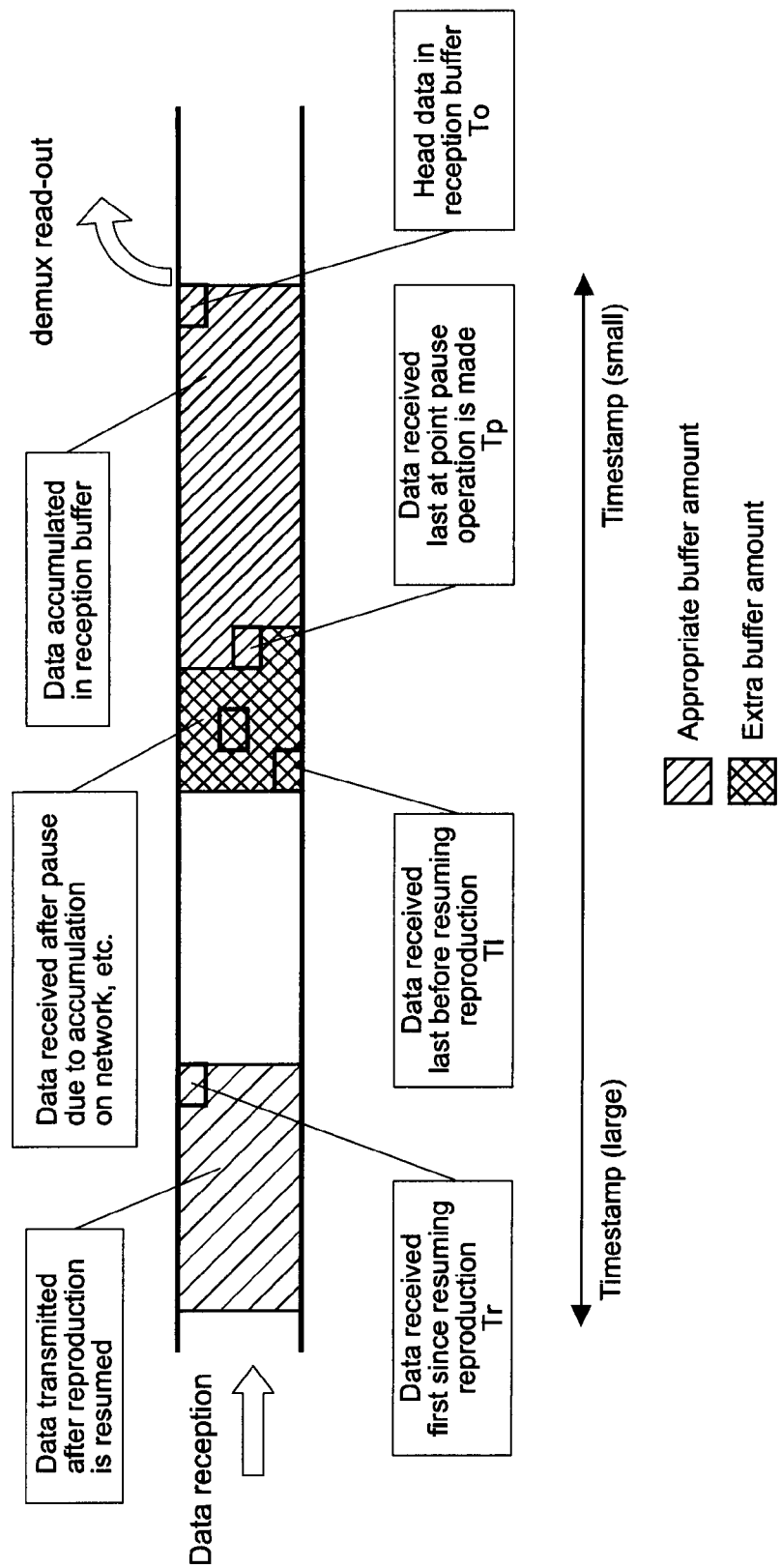
FIG. 9 is a diagram for explaining a position of data received and buffered by the TV according to the embodiment of the present invention and a timestamp thereof.

In the description, a definition of a timestamp value as an identifier of the packet data, that is necessary for the processing of the RTP processor 221, will be described. FIG. 9 is a diagram for explaining a position of packet data received and buffered by the TV 100 and a timestamp thereof.

As shown in the figure, packet data accumulated in the reception buffer is successively read out by the demultiplexer 28 to be decoded (reproduced). As described above, by the RTSP processor 222 transmitting a pause request to the server 200 upon receiving a pause operation from the user, transmission of the packet data by the server 200 is stopped. However, packet data and the like transmitted from the server 200 and accumulated on the network before the pause request reaches the server 200 is received by the TV 100 after the pause operation is made and accumulated in the reception buffer. However, since the data received after the pause operation may cause an overflow of the reception buffer, this embodiment performs control so that data is not accumulated in the reception buffer as much as possible. In addition, as described above, by the RTSP processor 222 transmitting a play request to the server 200 upon receiving a reproduction resume operation from the user, data transmission from the server 200 is resumed.

Here, in this embodiment, four timestamp values of To, Tp, Tl, and Tr are defined as follows.

To: timestamp of head packet data in reception buffer

Tp: timestamp of packet data received last at point when pause operation is made Tl: timestamp of packet data received last before resuming reproduction Tr: timestamp of packet data received first since resuming reproduction Based on the four timestamps, the RTP processor 221 executes processing at a time of resuming reproduction of a content.

Figure 10:
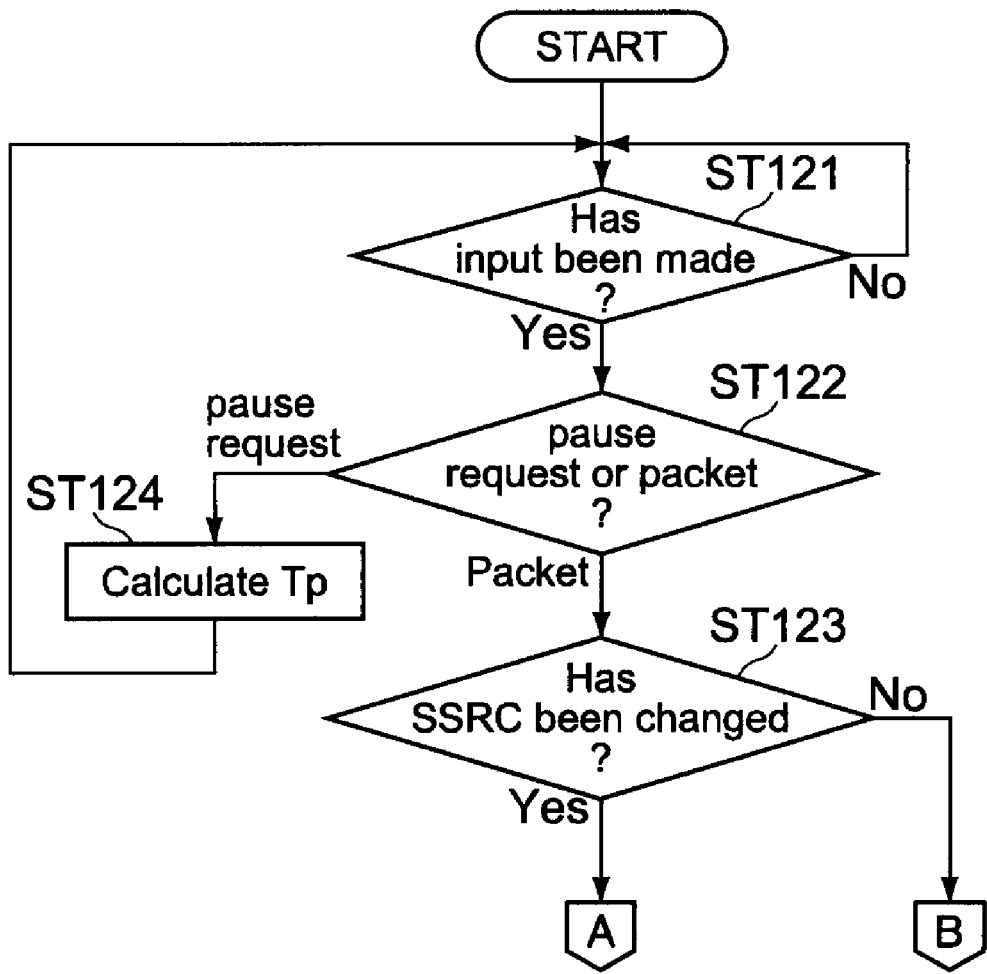
FIG. 10 is a flowchart showing an operational flow of an RTP processor of the TV according to the embodiment of the present invention.
Figure 11:
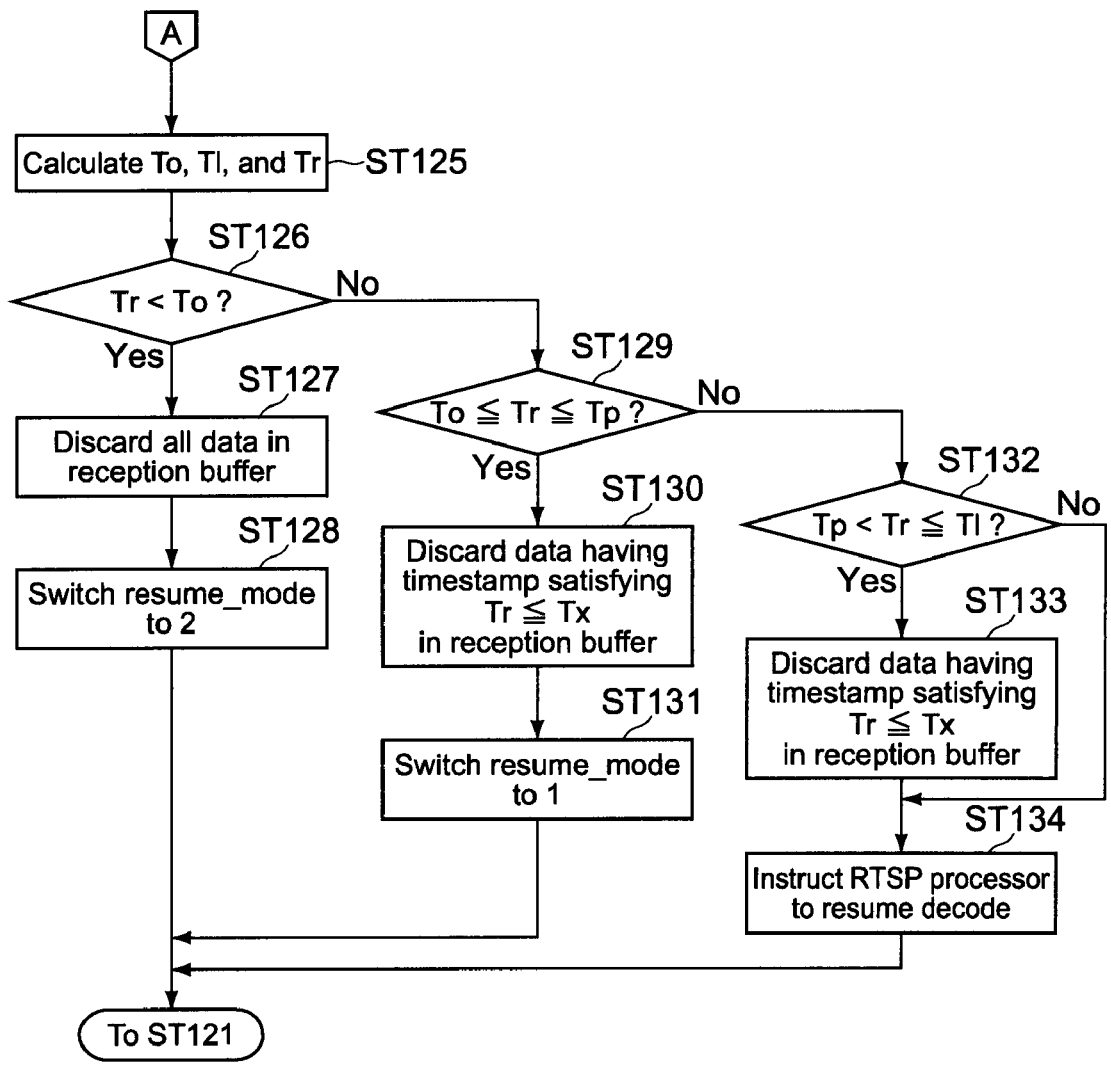
FIG. 11 is a flowchart showing an operational flow of the RTP processor of the TV according to the embodiment of the present invention.
Figure 12:
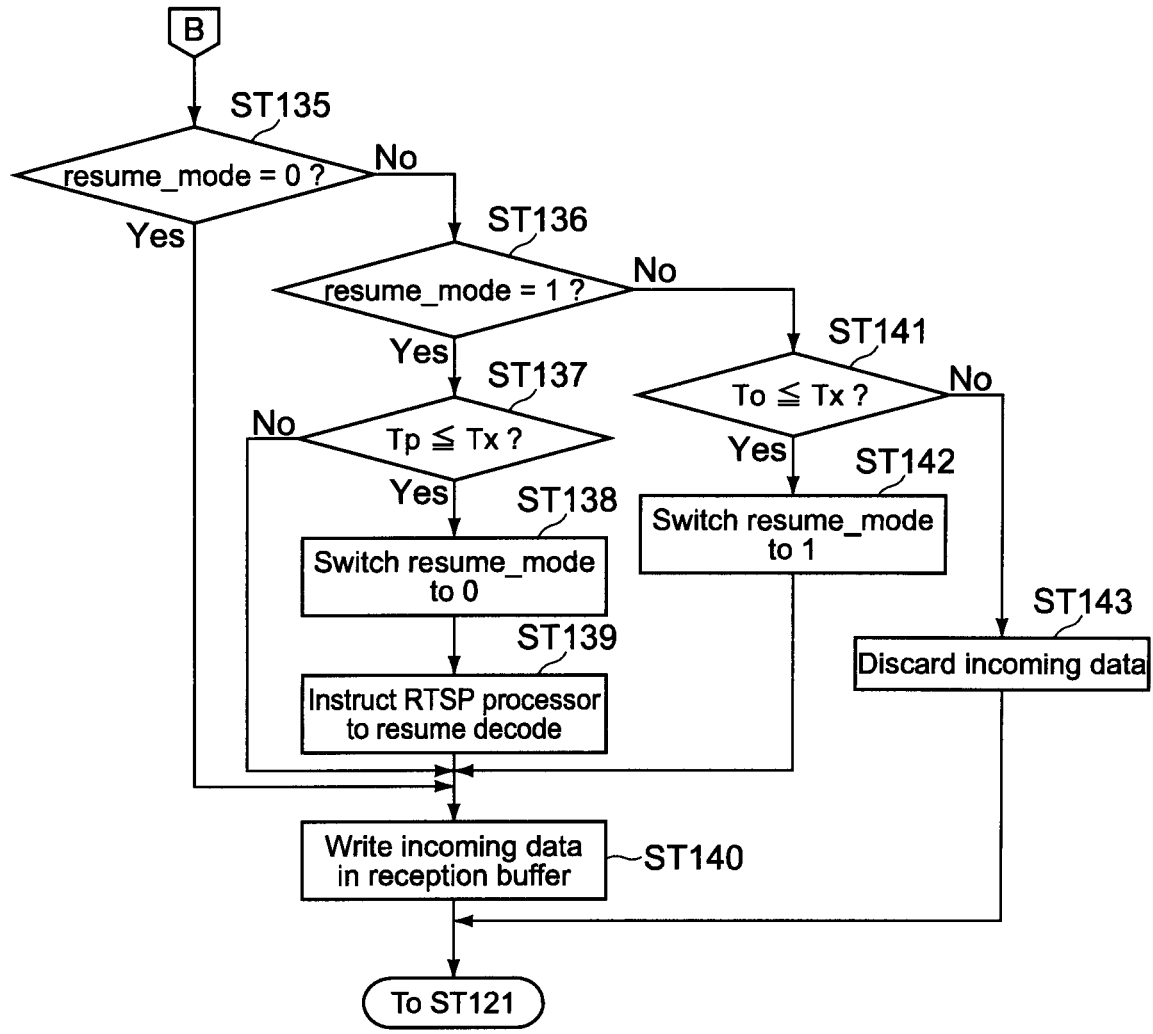
FIG. 12 is a flowchart showing an operational flow of the RTP processor of the TV according to the embodiment of the present invention.

FIGS. 10 to 12 are flowcharts each showing an operational flow of the RTP processor 221. Here, for convenience, "resume_mode" will be defined as a parameter that indicates what kind of additional processing is necessary for smoothly resuming reproduction of a content from a pause thereof. As resume_mode, the following three modes of 0 to 2 are defined, the initial value of which is 0.

resume_mode=0: mode that does not require additional processing and in which incoming packet data can be decoded immediately resume_mode=1: mode in which incoming data is written in reception buffer until packet data corresponding to Tp is received resume_mode=2: mode in which incoming data is discarded until packet data corresponding to To is received Hereinafter, the processing of the RTP processor 221 will be described together with transitions of the modes.

As shown in FIG. 10, the RTP processor 221 first waits for some kind of a signal to be input (Step 121). When a signal is input (Yes), the RTP processor 221 judges which of a pause request from the RTSP processor 222 and packet data from the server 200 the input is (Step 122).

When the input is a pause request, the RTP processor 221 calculates Tp above (Step 124) and returns to Step 121.

When the input is an input (reception) of packet data, the RTP processor 221 detects the SSRC identifier 59 of the received packet data. Then, the RTP processor 221 compares the SSRC identifier 59 of the received packet data with the SSRC identifier 59 of packet data received right before that data, and judges whether the SSRC identifier 59 has been changed between those two (Step 123).

When judged that the SSRC identifier 59 has been changed (Yes), that is, the received packet data is packet data that has been received first since resuming the reproduction, the RTP processor 221 advances to processing shown in FIG. 11. When judged that the SSRC identifier 59 is not changed (No), that is, the received packet data is packet data later than the RTP packet that has been received first since resuming the reproduction, the RTP processor 221 advances to processing shown in FIG. 12. A case where the received packet data is packet data that has been received after the pause operation and accumulated on the network 150 is also included.

First, processing carried out in a case where it is judged in Step 123 that the SSRC identifier 59 of the received packet data has been changed will be described.

As shown in FIG. 11, when the SSRC identifier 59 of the received packet data has been changed, the RTP processor 221 calculates To, Tl, and Tr described above from data in the reception buffer and the received packet data (Step 125).

Subsequently, the RTP processor 221 judges whether Tr<To is satisfied (Step 126). Specifically, a case where Tr<To is satisfied is a case where the same data as the packet data that has been received first since resuming the reproduction is already read out by the demultiplexer 28 and does not exist in the reception buffer (see FIG. 9). Generally, this case is considered to be a case where buffering of packet data in the reception buffer is insufficient (underflow is caused). However, in this embodiment, the reception buffer is implemented such that this case does not occur as much as possible.

When judged that Tr<To is satisfied (Yes), the RTP processor 221 discards all pieces of data (overlap data) in the reception buffer (Step 127). Then, the RTP processor 221 switches resume_mode to 2 (Step 128) and returns to Step 121 of FIG. 10.

When judged that Tr≧To is satisfied (No), the RTP processor 221 additionally judges whether To≦Tr≦Tp is satisfied (Step 129).

When judged that To≦Tr≦Tp is satisfied (Yes), the RTP processor 221 discards packet data (overlap data) having a timestamp Tx satisfying Tr≦Tx as an identifier in the reception buffer (Step 130). Then, the RTP processor 221 switches resume_mode to 1 (Step 131) and returns to Step 121 of FIG. 10.

When judged that To≦Tr≦Tp is not satisfied, that is, Tp<Tr<To is satisfied (No), the RTP processor 221 additionally judges whether Tp<Tr≦Tl is satisfied (Step 132). Specifically, a case where Tp<Tr≦Tl is satisfied is a case where packet data received at the time of the pause operation is not contained in packet data transmitted first from the server 200 after resuming the reproduction. This case occurs when a boundary between a GOP including the packet data received at the time of the pause operation and a GOP before that exists between Tp and Tl described above in a specification of IPSP and the like.

When judged that Tp<Tr≦Tl is satisfied (Yes), the RTP processor 221 discards packet data having a timestamp Tx satisfying Tr≦Tx as an identifier in the reception buffer (Step 133). Then, the RTP processor 221 transmits a notification instructing the decode to be resumed to the RTSP processor 222 that is waiting for the instruction to resume the decode (see Step 109) (Step 134). As a result, the decode of the packet data is resumed and reproduction of videos and audios of the content is resumed smoothly.

In the case where Tp<Tr≦Tl is satisfied, since packet data from Tp to Tr in the reception buffer is not discarded, the undiscarded packet data is additionally accumulated in the reception buffer as compared to the case where To≦Tr≦Tp is satisfied (see FIG. 9). However, an amount of extra packet data accumulated by one packet reception processing is sufficiently small and is thus not enough to cause an overflow of the reception buffer. However, if this case is repeated a plurality of times, the amount of extra packet data may increase to thus cause an overflow of the reception buffer. Therefore, by the reproduction resume point adjustment processing to be described later, the RTSP processor 222 can avoid such a case from occurring.

When judged that Tp<Tr≦Tl is not satisfied, that is, Tl<Tr is satisfied (No), the RTP processor 221 transmits a notification instructing the decode to be resumed to the RTSP processor 222 that is waiting for the instruction to resume the decode (see Step 109) (Step 134).

Specifically, this case is a case where a gap (skip) is caused between packet data received at the time of the pause operation and packet data received after resuming the reproduction. This is caused when an anomaly has occurred in the server 200 or when the server 200 is specified to resume data transmission from a head of a GOP closest to a pause point instead of a head of a GOP containing the pause point as described above with reference to FIG. 4. In this embodiment, the server 200 is designed so as not to cause such a case as much as possible. However, even if such a case occurs, it can be suppressed at minimum by the reproduction resume point adjustment processing to be described later.

Next, processing carried out in a case where it is judged in Step 123 of FIG. 10 that the SSRC identifier 59 of the received packet data is not changed will be described.

As shown in FIG. 12, when the SSRC identifier 59 of the received packet data is not changed, the RTP processor 221 judges whether resume_mode is 0 (Step 135). When judged that resume_mode is 0, that is, additional processing for smoothly resuming the reproduction is unnecessary (Yes), the RTP processor 221 writes the received packet data in the reception buffer (Step 140) and returns to Step 121 of FIG. 10.

When judged that resume_mode is not 0 (No), the RTP processor 221 judges whether resume_mode is 1 (Step 136). When judged that resume_mode is 1 (Yes), the RTP processor 221 judges whether a timestamp Tx of the received packet data satisfies Tp Tx (Step 137).

When judged that Tp≦Tx is satisfied, that is, the timestamp of the received packet data is equal to or larger than a timestamp of packet data received at the time of the pause operation (Yes), the RTP processor 221 switches resume_mode to 0 (Step 138). Subsequently, the RTP processor 221 transmits a notification instructing to resume the decode to the RTSP processor 222 (Step 139). Then, the RTP processor 221 writes the received packet data in the reception buffer (Step 140) and returns to Step 121 of FIG. 10.

When judged in Step 137 that Tp≦Tx is not satisfied (No), the RTP processor 221 writes the incoming data in the reception buffer (Step 140) and returns to Step 121 of FIG. 10.

When judged in Step 136 that resume_mode is not 1, that is, resume_mode is 2 (No), the RTP processor 221 judges whether the timestamp Tx of the received packet data satisfies To≦Tx (Step 141).

When judged that To≦Tx is satisfied, that is, the timestamp of the received packet data is equal to or larger than a timestamp of head packet data in the reception buffer (Yes), the RTP processor 221 switches resume_mode to 1 (Step 142). Then, the RTP processor 221 writes the received packet data in the reception buffer (Step 140) and returns to Step 121 of FIG. 10.

When judged in Step 141 that To≦Tx is not satisfied, that is, the timestamp of the received packet data falls below To (No), the RTP processor 221 discards the packet data (Step 143) and returns to Step 121 of FIG. 10.

Summarizing the above processing, the RTP processor 221 executes the following processing according to what range a timestamp Tr of packet data that has been received first since resuming the reproduction exists in, as compared to To, Tp, and Tl described above.

(Case of Tr<To)

The RTP processor 221 discards all pieces of packet data in the reception buffer and discards the received packet data until receiving packet data including a timestamp corresponding to To after resuming the reproduction. Moreover, the RTP processor 221 writes the packet data including a timestamp of To or more in the reception buffer. Then, the RTP processor 221 resumes the decode of the packet data at a point the packet data including a timestamp corresponding to Tp is received.

Accordingly, by resuming the decode after waiting for packet data including a timestamp corresponding to Tp to be received, the RTP processor 221 can ensure a continuity between packet data at a time of a pause and packet data at a time of resuming reproduction while avoiding an underflow.

(Case of To≦Tr≦Tp)

The RTP processor 221 discards all pieces of packet data including a timestamp of Tr or more in the reception buffer. Moreover, the RTP processor 221 resumes the decode of the packet data at a point packet data including a timestamp corresponding to Tp is received after the reproduction is resumed.

As a result, the RTP processor 221 can ensure a continuity between packet data at the time of the pause and packet data at the time of resuming the reproduction while maintaining the reception buffer size to be constant.

(Case of Tp<Tr≦Tl)

The RTP processor 221 discards packet data including a timestamp of Tr or more in the reception buffer and resumes the decode at that point.

As a result, a continuity between packet data at the time of the pause and packet data at the time of resuming the reproduction can be ensured while suppressing the amount of extra packet data accumulated in the reception buffer as much as possible.

(Case of Tl<Tr)

The RTP processor 221 resumes the decode using the received packet data as it is. In this case, a skip occurs between the packet data at the time of the pause and the packet data at the time of resuming the reproduction.

Next, the reproduction resume point adjustment processing will be described.

As described above, the RTSP processor 222 has a function of adjusting a reproduction resume point (pause point) as necessary when transmitting to the server 200 a play request that requests reproduction to be resumed together with the pause point.

The pause point adjustment is carried out in (1) a case where there is a possibility that Tp<Tr≦Tl will be satisfied (possibility that extra packet data may be accumulated in reception buffer) or (2) a case where there is a possibility that Tl<Tr will be satisfied (possibility that skip may occur between packet data at time of pause and packet data at time of resuming reproduction), though the processing is not essential.

Specifically, when the case of (1) or (2) above occurs at a time a play request is transmitted to the server 200 and an incoming packet after reproduction is resumed is received, it is possible for the RTSP processor 222 to execute the pause point adjustment prior to transmitting the play request at a time of the next resume reproduction processing. This is for preventing, at the time of the next resume reproduction, the case of (1) or (2) above from occurring since it is expected to occur when it has occurred at the time of the previous resume reproduction.

First, processing carried out in a case where the case of (1) above has occurred will be described.

Figure 13:
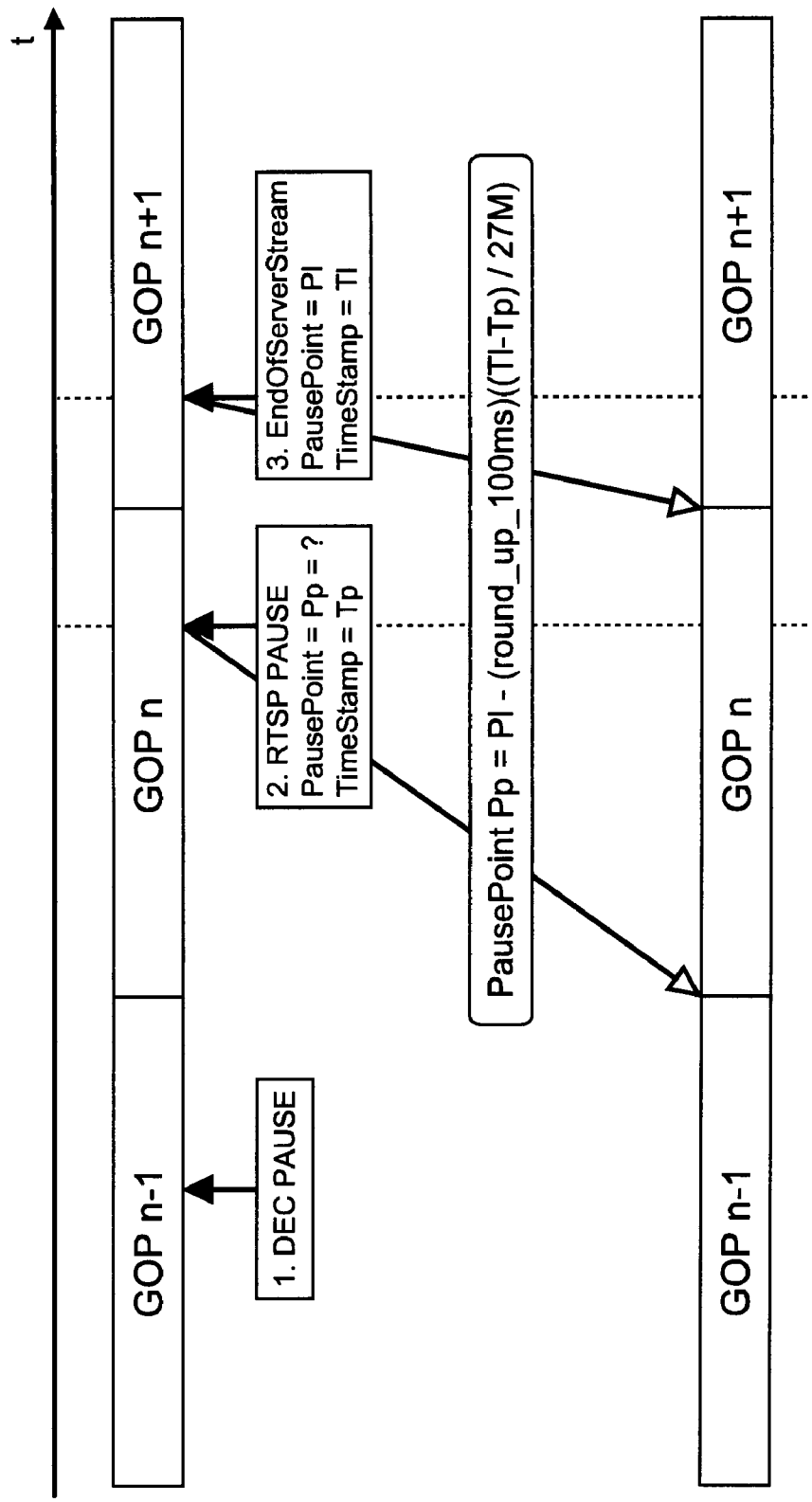
FIG. 13 is a diagram for explaining processing of the TV for adjusting a reproduction resume point according to the embodiment of the present invention.

FIG. 13 is a diagram for explaining processing of the RTSP processor 222 for adjusting a pause point.

As shown in the figure, when a pause operation is made, after stopping the decoder (1. in FIG. 13), the RTSP processor 222 transmits a pause request to the RTP processor 221 (2. in FIG. 13), and the server 200 stops transmission in response to the pause request from the RTSP processor 222 (3. in FIG. 13). A timestamp at a point the RTP processor 221 has received the pause request is Tp described above, and a timestamp at a point the server 200 has stopped the transmission is Tl described above.

When a reproduction resume operation is made, the RTSP processor 222 transmits a play request to the server 200 using a pause point Pl of the server 200. In response to the play request, the server 200 resumes transmission of packet data from a head of the GOP #n+1 including Pl. At this time, when a timestamp Tl corresponding to the pause point Pl of the server 200 is relatively close to the head of the GOP #n+1, overlap data of the packet data transmitted from the server 200 after the reproduction is resumed lessens. In this case, the timestamp Tr of the packet data that has been transmitted first since the reproduction is resumed is located after Tp described above, thus causing the case of (1) above. If this case continues, an overflow of the reception buffer may be caused.

In this regard, in a case where the case of (1) above has occurred, at a time of transmitting a next play request, the RTSP processor 222 requests the server 200 to resume the transmission from a pause point Pp of the RTSP processor 222 instead of the pause point Pl of the server 200 as shown in the figure. In the case where the case of (1) above has occurred, the RTP processor 221 notifies the RTSP processor 222 to that effect together with the instruction to resume the decode in Step 134 of FIG. 11, for example.

Pp described above is not given by the server 200, so the RTSP processor 222 calculates Pp based on Pl, Tl, and Tp described above. Specifically, as shown in the figure, the RTSP processor 222 obtains Pp by dividing a value obtained by subtracting the timestamp Tp corresponding to Pp from the timestamp Tl corresponding to Pl by 27 MHz and rounding up the value by 100 ms. Here, 27 MHz is a system clock as a reference for generating a timestamp in the server 200.

The RTSP processor 222 then incorporates the calculated Pp in the next play request to be transmitted to the server 200. Accordingly, the timestamp of data transmitted first by the server 200 at the time of resuming the reproduction becomes a head of the GOP #n including Tp instead of a head of the GOP #n+1. Therefore, a sufficient overlap is caused between packet data newly transmitted from the server 200 and packet data in the reception buffer at the time of the pause and at the time of resuming the reproduction, with the result that a state of To≦Tr≦Tp (case where resume_mode=1) can be caused. After that, by the RTP processor 221 executing the processes of Step 129 and subsequent steps in FIG. 11, the data amount of the reception buffer can be maintained to be constant to thus prevent an overflow.

It should be noted that since it is considered that the amount of extra packet data accumulated in the reception buffer is minute in the case of (1) above, the RTSP processor 222 does not need to adjust the pause point even when the case of (1) above occurs.

Moreover, not only when the case of (1) above occurs but also when the packet data amount accumulated in the reception buffer exceeds a predetermined threshold value at which an overflow may occur, the RTSP processor 222 may execute the pause point adjustment.

In this case, the RTP processor 221 monitors the packet data amount in the reception buffer and when the packet data amount exceeds the predetermined value, notifies the RTSP processor 222 to that effect. Then, the RTSP processor 222 transmits a play request using Pp described above at a time of the next resume reproduction.

Next, processing carried out in a case where the case of (2) above has occurred will be described.

Figure 14:
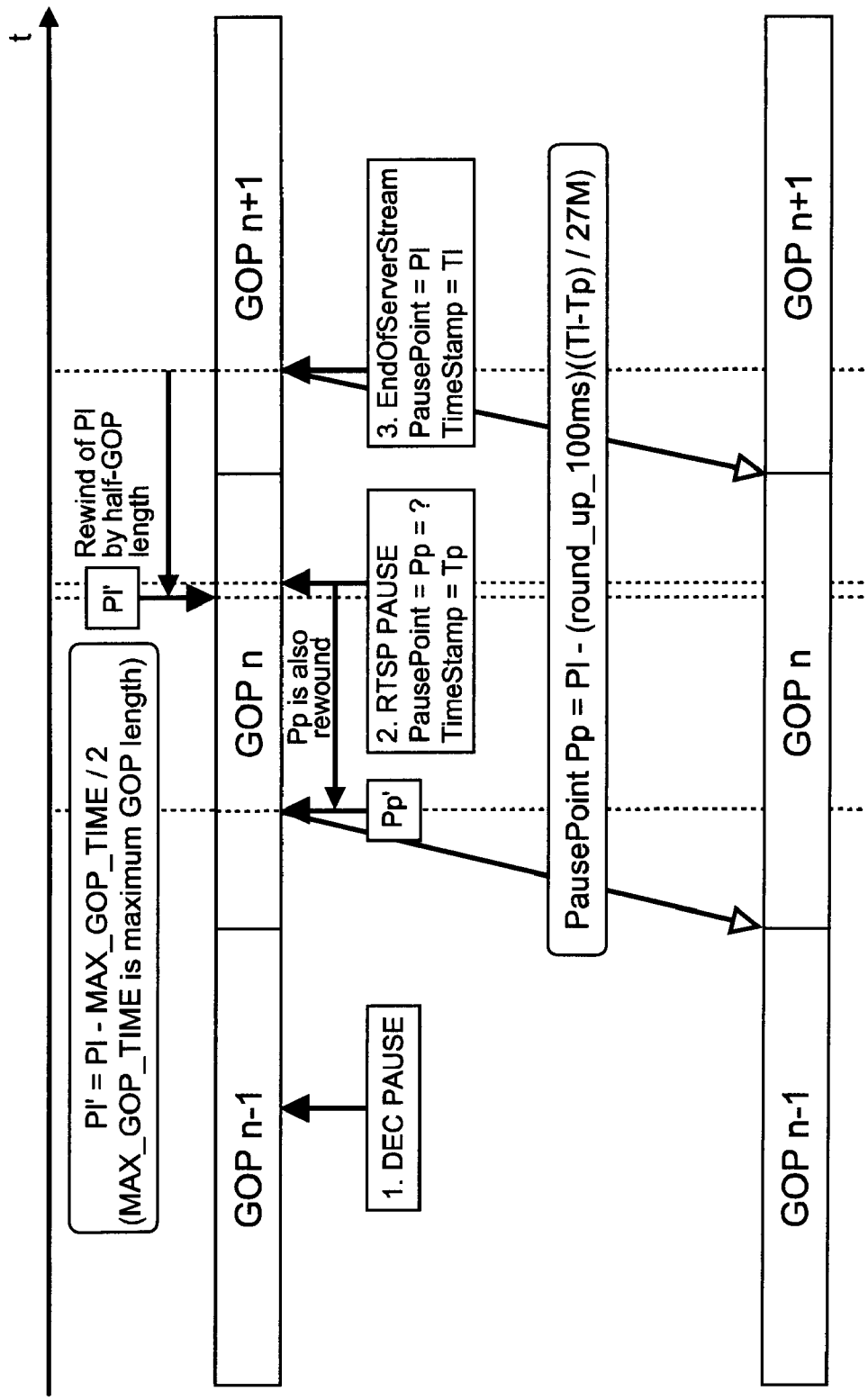
FIG. 14 is a diagram for explaining processing of the TV for adjusting the reproduction resume point according to the embodiment of the present invention.

FIG. 14 is a diagram for explaining processing of the RTSP processor 222 for adjusting a pause point.

As described above, when the server 200 is specified to resume transmission of packet data from a head of the GOP including the pause point Pl, as long as the TV 100 transmits a play request using a pause point acquired from the server 200, the skip is not caused in general. Therefore, in the case of such a specification, a data skip occurs when the server 200 has not transmitted the packet data properly or when an anomaly such as packet data being lost on the network 150 occurs.

Therefore, when the server 200 is specified to resume the transmission of packet data from a head of the GOP including the pause point Pl, the RTSP processor 222 only needs to adjust the pause point by the same processing as the case of (1) above. In this case, when judged that Tl<Tr is satisfied in Step 132 of FIG. 11, the RTP processor 221 notifies the RTSP processor 222 to that effect together with the decode resume instruction in Step 134 described above, for example. As a result, the RTSP processor 222 can prevent a skip of packet data from occurring at a time of resuming the reproduction next.

On the other hand, when the server 200 is specified to resume the transmission of packet data from a head (boundary) of the GOP closest to the pause point instead of a head of the GOP including the pause point Pl, Tr is not changed even when the processing shown in FIG. 13 is executed. In other words, even if the RTSP processor 222 transmits a play request using Pp in place of Pl in FIG. 13, transmission is eventually resumed from the head of the GOP #n+1 and a skip still occurs.

In this regard, the RTSP processor 222 rewinds the pause point Pl acquired from the server 200 only by half the GOP and uses the acquired value to calculate Pp described above. FIG. 14 is an explanatory diagram of processing in this case.

As shown in the figure, the RTSP processor 222 subtracts MAX_GOP_TIME/2 as half the time of a maximum GOP length (time) from the pause point Pl acquired from the server 200 to obtain Pl' obtained as a result of rewinding Pl by half the GOP length. Then, the RTSP processor 222 calculates Pp described above using Pl' (Pp'). Consequently, Pp' comes closer to the head of the GOP #n than the head of the GOP #n+1. Accordingly, by the RTSP processor 222 transmitting the play request to the server 200 using Pp', the server 200 resumes the transmission of the packet data from the head of the GOP #n.

In this case, even when the RTSP processor 222 calculates Pp first and then rewinds this Pp half the GOP length, the same effect can of course be obtained.

By the processing described above, even when the server 200 is specified to resume transmission of packet data from a head (boundary) of a GOP closest to a pause point, the RTSP processor 222 can prevent a skip of the packet data at a time of resuming reproduction next.

As described above, according to this embodiment, by deleting overlap data from the reception buffer in accordance with a position of Tr at the time of resuming reproduction of a content after a pause thereof, the TV 100 can ensure a continuity between the packet data at the time of the pause and the time of resuming the reproduction. Accordingly, smooth resume reproduction having no disturbed images and audios is executed. Moreover, by maintaining the packet data amount of the reception buffer to be constant, the TV 100 can prevent an overflow and underflow of the reception buffer.

Modified Example

The present invention is not limited to the above embodiment and various modifications may of course be added without departing from the gist of the invention.

The flowcharts of FIGS. 8 and 10 to 12 in the above embodiment do not describe abnormal system processing. However, when an anomaly occurs, processing of processing stop, error display, and the like are executed as appropriate.

In the above embodiment, the example of using a timestamp as an identifier in a case where a stream format of data transmitted from the server is timestamp-attached MPEG2-TS (TTS) has been described. However, the present invention can also be applied to various other stream formats such as MPEG2-PS (Program Steam) and MPEG 4 by replacing an identifier to other data depending on the format. In MPEG2-PS, for example, the TV 100 can uniquely identify overlap data as in the case of TTS described above by using a value of a PTS (Presentation Time Stamp) contained in a PES header at a head of a GOP and an offset value based on that value as an identifier.

In the above embodiment, the processing of the RTSP processor 222 has been asynchronous processing. However, at least a part of the processing of the RTSP processor 222 may be synchronous processing. In this case, the order of carrying out the processing of the RTSP processor 222 shown in FIG. 8 and the processing of the RTP processor 221 shown in FIGS. 10 to 12 can be changed as appropriate.

In the above embodiment, the format of streaming data from the server 200 has been timestamp-attached MPEG2-TS. However, the format of streaming data may be MPEG2-PS, or other compression formats such as MPEG4 may be used.

In the above embodiment, the TV has been exemplified as the electronic apparatus that receives contents. However, the electronic apparatus may be other electronic apparatuses such as a recording/reproducing apparatus including a recording medium such as an HDD/BD/DVD, a reproducing apparatus such as a BD/DVD player, a PC, a game machine, portable AV equipment, a cellular phone, a car navigation apparatus, and a robot apparatus.

The present application contains subject matter related to that disclosed in Japanese Priority Patent Application JP 2008-250879 filed in the Japan Patent Office on Sep. 29, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus, comprising:
   a reception means for receiving data of a content transmitted through streaming from a transmission apparatus;
   a buffer means for buffering the received data;
   a reproduction means for successively reading out and reproducing the buffered data;
   an operation reception means for receiving information identifying a pause operation and a resume operation in the reproduction of the buffered data, and the pause and resume operations being received at corresponding times;
   a transmission means for transmitting, in response to the pause operation and the resume operation, corresponding ones of a pause request and a resume request to the transmission apparatus; and
   a control means configured to instruct the buffer means to discard at least a portion of the buffered data that overlaps data received after the transmission of the resume request, and to buffer at least a portion of the received data that is identical to the discarded data, the control means being further configured to:
   identify first and second content positions within the streamed content, the first content position corresponding to the pause operation time, and the second content position corresponding to an initial portion of the data received subsequent to the resume operation time;

determine whether the second position precedes the first position within the streamed content; and discard the portion of the buffered data disposed between the first and second positions, when the second position precedes to the first position.

2. The electronic apparatus of claim 1, wherein the control means is further configured to:

instruct the buffer means to buffer at least a portion of the received data disposed between the second position to the first position; and instruct the reproduction means to resume the reproduction when the data from the second position to the first position received after the discard is buffered.

3. The electronic apparatus of claim 2, wherein the control means detects a third position of data that has been received first among the data buffered by the buffer means at the pause operation time, along a reproduction time axis, controls, when the second position is located before the third position, the buffer means to discard the buffered data from the third position to the first position and the received data before the third position and buffer data from the third position to the first position received after the discard, and controls the reproduction means to resume the reproduction when the data from the third position to the first position received after the discard is buffered.

4. The electronic apparatus of claim 3, wherein the control means detects a fourth position of data that has been received last during a period from the pause operation time to the resume operation time, along the reproduction time axis, controls, when the second position is located between the first position and the fourth position, the buffer means to discard the buffered data from the second position to the fourth position, and controls the reproduction means to resume the reproduction when the data from the second position to the fourth position is discarded.

5. The electronic apparatus of claim 4, wherein the control means controls, when the second position is located after the fourth position, the transmission means to transmit to the transmission apparatus the resume request that requests the data to be transmitted from the first position at a time associated with a subsequent transmission of the resume request.

6. The electronic apparatus of claim 3, wherein the control means detects a fourth position of data that has been received last during a period from the pause operation time to the resume operation time, along the reproduction time axis, and controls, when the second position is located between the first position and the fourth position, the transmission means to transmit to the transmission apparatus the resume request that requests the data to be transmitted from the first position at a time associated with a subsequent transmission of the resume request.

7. The electronic apparatus of claim 6, wherein the control means controls, when an amount of data buffered by the buffer means exceeds a predetermined amount, the transmission means to transmit to the transmission apparatus the resume request that requests the data to be transmitted from the first position.

8. A content reproduction method, comprising:

receiving data of a content transmitted through streaming from a transmission apparatus;

buffering the received data;

successively reading out and reproducing the buffered data;

receiving a pause operation and a resume operation regarding reproduction of the buffered data;

transmitting, in response to the pause operation and the resume operation, corresponding ones of a pause request and a resume request to the transmission apparatus; and discarding, using a processor, at least a portion of the buffered data that overlaps data received after the transmission of the resume request, and to buffer at least a portion of the received data that is identical to the discarded data, the generating comprising:

identifying first and second content positions within the streamed content, the first content position corresponding to the pause operation time, and the second content position corresponding to an initial portion of the data received subsequent to the resume operation time;

determining whether the second position precedes the first position within the streamed content; and discarding the portion of the buffered data disposed between the first and second positions, when the second position precedes to the first position.

9. A tangible, non-transitory computer-readable storage medium storing instructions that, when executed by at least one processor, cause the processor to perform a method, comprising:

receiving data of a content transmitted through streaming from a transmission apparatus;

buffering the received data;

successively reading out and reproducing the buffered data;

receiving a pause operation and a resume operation regarding reproduction of the buffered data;

transmitting, in response to the pause operation and the resume operation, corresponding ones of a pause request and a resume request to the transmission apparatus; and discarding, using a processor, at least a portion of the buffered data that overlaps data received after the transmission of the resume request, and to buffer at least a portion of the received data that is identical to the discarded data, the generating comprising:

identifying first and second content positions within the streamed content, the first content position corresponding to the pause operation time, and the second content position corresponding to an initial portion of the data received subsequent to the resume operation time;

determining whether the second position precedes the first position within the streamed content; and discarding the portion of the buffered data disposed between the first and second positions, when the second position precedes to the first position.

10. An electronic apparatus, comprising:

a reception section to receive data of a content transmitted through streaming from a transmission apparatus;

a buffer section to buffer the received data;

a reproduction section to successively read out and reproduce the buffered data;

an operation reception section to receive information identifying a pause operation and a resume operation in the reproduction of the buffered data, and the pause and resume operations being received at corresponding times;

a transmission section to transmit, in response to the pause operation and the resume operation, corresponding ones of a pause request and a resume request to the transmission apparatus; and a control section configured to instruct the buffer section to discard at least a portion of the buffered data that overlaps data received after the transmission of the resume request, and to buffer at least a portion of the received data that is identical to the discarded data, the control section being further configured to:

identify first and second content positions within the streamed content, the first content position corresponding to the pause operation time, and the second content position corresponding to an initial portion of the data received subsequent to the resume operation time;

determine whether the second position precedes the first position within the streamed content; and discard the portion of the buffered data disposed between the first and second positions, when the second position precedes to the first position.

* * * * *